US012604172B2

(12) United States Patent (10) Patent No.: US 12,604,172 B2
Khan et al. (45) Date of Patent: Apr. 14, 2026

(54) ELECTRONIC DEVICE AND METHOD OF OPERATING THE ELECTRONIC DEVICE

(71) Applicant: Samsung Electronics Co., Ltd., Suwon-si (KR)

(72) Inventors: Faisal Khan, Dacca (BD); Md. Mahmud Muntakim Khan, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/502,742

(22) Filed: Nov. 6, 2023

(65) Prior Publication Data

US 2024/0129698 A1 Apr. 18, 2024

Related U.S. Application Data

(63) Continuation of application No. PCT/KR2023/015515, filed on Oct. 10, 2023.

(30) Foreign Application Priority Data

Oct. 11, 2022 (KR) ........................ 10-2022-0129751

(51) Int. Cl.
*H04W 8/00* (2009.01)
*H01Q 5/25* (2015.01)
(Continued)

(52) U.S. Cl.
CPC ............. *H04W 8/005* (2013.01); *H04L 69/18* (2013.01); *H04L 69/24* (2013.01); *H04W 8/24* (2013.01);
(Continued)

(58) Field of Classification Search
CPC . H04L 67/30–306; H04L 69/18; H04L 69/24; H04W 8/005; H04W 8/22–245; H04W 28/0215; H04W 76/14–15
See application file for complete search history.

(56) References Cited

U.S. PATENT DOCUMENTS 8,385,913 B2 * 2/2013 Proctor, Jr. .......... G06Q 20/384
726/20
9,485,795 B2 * 11/2016 Barathalwar ......... H04W 8/005
(Continued)

FOREIGN PATENT DOCUMENTS

CN 110972063 A 4/2020
KR 10-2017-0047732 A 5/2017
(Continued)

OTHER PUBLICATIONS

EPO Written Opinion for EP23877624, European Patent Office (issued Nov. 4, 2025).*
(Continued)

*Primary Examiner* — Brendan Y Higa
(74) *Attorney, Agent, or Firm* — Jefferson IP Law, LLP

(57) ABSTRACT

An electronic device for executing a service and an application suitable for a nearby Internet-of-Things (IoT) device paired with the electronic device by using a short-range communication method, based on the performance and state of the IoT device, and a method of operating the electronic device are provided. The first electronic device includes receiving, from a second electronic device, information about the second electronic device including identification information of the second electronic device, information about a communication protocol available in the second electronic device, and information about a wireless communication method available in the second electronic device, and based on the information about the second electronic
(Continued)

Smart tag device, determining at least one application executable by the second electronic device.

20 Claims, 24 Drawing Sheets

(51) Int. Cl.

| | | |
|---|---|---|
| *H04L 67/12* | (2022.01) | |
| *H04L 69/18* | (2022.01) | |
| *H04L 69/24* | (2022.01) | |
| *H04W 4/70* | (2018.01) | |
| *H04W 8/24* | (2009.01) | |

(52) U.S. Cl.

CPC ................ *H01Q 5/25* (2015.01); *H04L 67/12* (2013.01); *H04W 4/70* (2018.02)

(56) References Cited

U.S. PATENT DOCUMENTS

| | | | |
|---|---|---|---|
| 10,172,168 B2 | 1/2019 | Jang et al. | |
| 10,708,746 B2 * | 7/2020 | Qi ......................... | H04W 8/005 |
| 10,785,051 B2 | 9/2020 | Kang et al. | |
| 10,838,705 B2 | 11/2020 | Riedl et al. | |
| 11,323,294 B2 | 5/2022 | Tertinek et al. | |
| 2010/0015919 A1 * | 1/2010 | Tian ...................... | H04W 8/005 |
| | | | 455/41.2 |
| 2011/0188391 A1 * | 8/2011 | Sella ................... | H04W 74/085 |
| | | | 370/252 |
| 2016/0098241 A1 * | 4/2016 | Lim ........................ | H04L 43/00 |
| | | | 715/761 |
| 2016/0278006 A1 * | 9/2016 | Lee ........................ | H04W 12/04 |
| 2017/0223610 A1 * | 8/2017 | Qi ........................... | H04W 4/80 |
| 2017/0325047 A1 | 11/2017 | Park et al. | |
| 2018/0139265 A1 | 5/2018 | Shah et al. | |
| 2018/0165088 A1 | 6/2018 | Bonar et al. | |
| 2019/0150062 A1 * | 5/2019 | Bradley ............... | H04W 8/005 |
| | | | 370/254 |
| 2020/0092124 A1 | 3/2020 | Jeong | |
| 2020/0106877 A1 * | 4/2020 | Ledvina ............... | H04W 12/06 |
| 2021/0173064 A1 | 6/2021 | Yoon et al. | |
| 2022/0007333 A1 | 1/2022 | Lee et al. | |
| 2022/0182453 A1 | 6/2022 | Jung et al. | |
| 2022/0210631 A1 | 6/2022 | Lee et al. | |
| 2022/0276365 A1 | 9/2022 | Yoon et al. | |
| 2022/0376980 A1 * | 11/2022 | Bhat ...................... | G06N 3/092 |
| 2023/0010267 A1 * | 1/2023 | Kincaid ............. | G07C 9/00309 |
| 2023/0394463 A1 | 12/2023 | Cho et al. | |

FOREIGN PATENT DOCUMENTS

| | | |
|---|---|---|
| KR | 10-2021-0039643 A | 4/2021 |
| KR | 10-2021-0071540 A | 6/2021 |
| KR | 10-2022-0104187 A | 7/2022 |
| KR | 10-2594360 B1 | 10/2023 |
| WO | 2022/092918 A1 | 5/2022 |

OTHER PUBLICATIONS

International Search Report dated Jan. 11, 2024, issued in International Application No. PCT/KR2023/015515.

European Search Report dated Nov. 4, 2025, issued in European Application No. 23877624.9.

* cited by examiner

Smart tag

FIG. 9A

| Application on device | | | | | | |
|---|---|---|---|---|---|---|
| | Transfer Protocols | WIFI | BT | BLE | NFC | IR |
| App 1 | 1 | 1 | 1 | 1 | 0 | 0 |
| App 2 | 2 | 1 | 0 | 0 | 1 | 1 |
| App 3 | 1 | 0 | 0 | 0 | 1 | 0 |
| App 4 | 2 | 1 | 1 | 1 | 0 | 0 |
| App 5 | 1 | 0 | 1 | 1 | 0 | 0 |

| IoT Info Payload | | | | | | |
|---|---|---|---|---|---|---|
| Basic Info | Transfer Protocols | WIFI | BT | BLE | NFC | IR |
| 123121 | 1 | 1 | 1 | 1 | 0 | 0 |

1101   IoT Device ID #: 123121

1102   IoT Device ID #: 133245

1103   IoT Device ID #: 143567

1104   IoT Device ID #: 111768

1105   IoT Device ID #: 123568

FIG.  11B

| IoT Device ID | App 1 | App 2 | App 3 | App 4 | App 5 |
|---|---|---|---|---|---|
| 123121 | 1 | 1 | 0 | 0 | 0 |
| 133245 | 0 | 1 | 0 | 0 | 0 |
| 143567 | 0 | 0 | 1 | 0 | 0 |
| 111768 | 0 | 0 | 0 | 0 | 0 |
| 123568 | 0 | 0 | 0 | 0 | 0 |

START

RECEIVE UWB RANGING INITIATION MESSAGE
FROM FIRST ELECTRONIC DEVICE — 1410

TRANSMIT, TO FIRST ELECTRONIC DEVICE,
RESPONSE MESSAGE TO UWB RANGING
INITIATION MESSAGE — 1420

TRANSMIT INFORMATION ABOUT
SECOND ELECTRONIC DEVICE — 1430

RECEIVE, FROM FIRST ELECTRONIC DEVICE,
COMMAND TO EXECUTE AT LEAST ONE APPLICATION
EXECUTABLE BY SECOND ELECTRONIC DEVICE — 1440

END

ELECTRONIC DEVICE AND METHOD OF OPERATING THE ELECTRONIC DEVICE

CROSS-REFERENCE TO RELATED APPLICATION(S)

This application is a continuation application, claiming priority under § 365(c), of an International application No. PCT/KR2023/015515, filed on Oct. 10, 2023, which is based on and claims the benefit of a Korean patent application number 10-2022-0129751, filed on Oct. 11, 2022, in the Korean Intellectual Property Office, the disclosure of which is incorporated by reference herein in its entirety.

TECHNICAL FIELD

The disclosure relates to a technique for sensor network, machine to machine (M2M), machine-type communication (MTC), and Internet of Things (IoT). More particularly, the disclosure relates to an electronic device for providing a method of executing a service or application associated with an IoT device, and a method of operating the electronic device.

BACKGROUND ART

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, an intelligent Internet technology (IT) service to create new value for peoples' lives may be provided by collecting and analyzing data generated from connected objects. IoT may be applied to various fields, such as smart homes, smart buildings, smart cities, smart cars or connected cars, smart grids, health care, smart home appliances, or high-tech medical services, via the convergence and combination of existing information technology (IT) and various industries.

With the development of wireless communication systems, it is possible to provide various services, for which there exists a need for a method of effectively providing the services. For example, in medium access control (MAC), a ranging technique for measuring a distance between electronic devices by using ultra-wideband (UWB) may be used. UWB is a wireless communication technology that uses an ultra-wide frequency band of several GHz or greater in a baseband without using a radio carrier. Recently, research on applying the UWB technology to the IoT technology has been actively conducted.

As IoT ecosystems develop, there is a need for a method of efficiently accessing an IoT device and efficiently performing a service or application associated with the IoT device.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide, in an electronic device paired with a nearby Internet-of-Things (IoT) device by using a short-range communication method such as ultra-wideband (UWB), a service and an application suitable for the IoT device based on the performance and state of the IoT device.

Additional aspects will be set forth in part in the description which follows and, in part, will be apparent from the description, or may be learned by practice of the presented embodiments.

Technical Solution

In accordance with an aspect of the disclosure, a method of operating a first electronic device is provided. The method includes transmitting an ultra-wideband (UWB) ranging initiation message to a second electronic device, identifying the second electronic device by receiving a response message to the UWB ranging initiation message from the second electronic device, receiving, from the second electronic device, information about the second electronic device including identification information of the second electronic device, information about a communication protocol available in the second electronic device, and information about a wireless communication method available in the second electronic device, and based on the information about the second electronic device, determining at least one application executable by the second electronic device.

In another aspect of the disclosure, the determining of the at least one application includes, based on at least one of the identification information of the second electronic device, the information about the communication protocol, or the information about the wireless communication method, determining the at least one application executable by the second electronic device.

In another aspect of the disclosure, the determining of the at least one application includes determining the at least one application by comparing information about a communication protocol required for executing an application installed in the first electronic device and information about a wireless communication method required for executing the application, with the information about the communication protocol available in the second electronic device and the information about the wireless communication method available in the second electronic device.

In another aspect of the disclosure, the information about the second electronic device be received by using a payload containing the identification information of the second electronic device, a setting value for the communication protocol available in the second electronic device among setting values respectively assigned to a plurality of communication protocols, and flag information indicating whether the second electronic device is able to use each of a plurality of preset wireless communication methods.

In another aspect of the disclosure, the method further includes displaying information about the determined at least one application, receiving a user input for selecting an application from among the determined at least one application, and transmitting information about the selected application to the second electronic device.

In another aspect of the disclosure, the displaying of the information about the determined at least one application includes adding an identification mark to an application executable by the second electronic device among applications installed in the first electronic device, and displaying the applications installed in the first electronic device.

In another aspect of the disclosure, the displaying of the information about the determined at least one application includes displaying information about an application previously executed in relation to the second electronic device.

In another aspect of the disclosure, the communication protocol includes at least one of Hypertext Transfer Protocol (HTTP), Hypertext Transfer Protocol Secure (HTTPS), File Transfer Protocol (FTP), Secure File Transfer Protocol (SFTP), Telnet (TErminaL NETwork), Post Office Protocol version 3 (POP3), Simple Mail Transfer Protocol (SMTP), Secure Shell (SSH), Secure Socket Layer (SSL), Simple Object Access Protocol (SOAP), or Address Resolution Protocol (ARP).

In another aspect of the disclosure, the wireless communication method includes at least one of Wi-Fi, Bluetooth, Bluetooth Low Energy (BLE), Wi-Fi direct (WFD), UWB, near-field communication (NFC), or Zigbee.

In accordance with another aspect of the disclosure, a first electronic device is provided. The first electronic device includes a memory storing one or more instructions, and at least one processor configured to execute the one or more instructions stored in the memory to transmit a UWB ranging initiation message to a second electronic device, identify the second electronic device by receiving a response message to the UWB ranging initiation message from the second electronic device, receive, from the second electronic device, information about the second electronic device including identification information of the second electronic device, information about a communication protocol available in the second electronic device, and information about a wireless communication method available in the second electronic device, and based on the information about the second electronic device, determine at least one application executable by the second electronic device.

In another aspect of the disclosure, the at least one processor is further configured to, based on at least one of the identification information of the second electronic device, the information about the communication protocol, or the information about the wireless communication method, determine the at least one application executable by the second electronic device.

In another aspect of the disclosure, the at least one processor is further configured to determine the at least one application by comparing information about a communication protocol required for executing an application installed in the first electronic device and information about a wireless communication method required for executing the application, with the information about the communication protocol available in the second electronic device and the information about the wireless communication method available in the second electronic device.

In another aspect of the disclosure, the information about the second electronic device is received by using a payload containing the identification information of the second electronic device, a setting value for the communication protocol available in the second electronic device among setting values respectively assigned to a plurality of communication protocols, and flag information indicating whether the second electronic device is able to use each of a plurality of preset wireless communication methods.

In another aspect of the disclosure, the at least one processor is further configured to display information about the determined at least one application, receive a user input for selecting an application from among the determined at least one application, and transmit information about the selected application to the second electronic device.

In another aspect of the disclosure, the at least one processor is further configured to add an identification mark to an application executable by the second electronic device among applications installed in the first electronic device, and display the applications installed in the first electronic device.

In another aspect of the disclosure, the at least one processor is further configured to display information about an application previously executed in relation to the second electronic device.

In accordance with another aspect of the disclosure, a method of operating a second electronic device is provided. The method includes receiving a UWB ranging initiation message from a first electronic device, transmitting, to the first electronic device, a response message to the UWB ranging initiation message, transmitting, to the first electronic device, information about the second electronic device including identification information of the second electronic device, information about a communication protocol available in the second electronic device, and information about a wireless communication method available in the second electronic device, and receiving, from the first electronic device, a command to execute at least one application executable by the second electronic device.

In accordance with another aspect of the disclosure, a second electronic device is provided. The second electronic device includes a memory storing one or more instructions, and at least one processor configured to execute the one or more instructions stored in the memory to receive a UWB ranging initiation message from a first electronic device, transmit, to the first electronic device, a response message to the UWB ranging initiation message, transmit, to the first electronic device, information about the second electronic device including identification information of the second electronic device, information about a communication protocol available in the second electronic device, and information about a wireless communication method available in the second electronic device, and receive, from the first electronic device, a command to execute at least one application executable by the second electronic device.

Advantageous Effects

According to an embodiment of the disclosure, user convenience may be improved by allowing a user to select a service and an application that are actually executable by various Internet-of-Things (IoT) devices. In addition, according to an embodiment of the disclosure, even in a case in which there is no prior information about an IoT device, the user may execute a service and an application associated with the IoT device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 9A is a diagram illustrating an example of application information according to an embodiment of the disclosure;

FIG. 9B is a diagram illustrating an example of information about a second electronic device, according to an embodiment of the disclosure;

FIG. 11B is a diagram illustrating a list of applications executable by the IoT devices illustrated in FIG. 11A according to an embodiment of the disclosure;

The same reference numerals are used to represent the same elements throughout the drawings.

MODE FOR INVENTION

Figure 1:
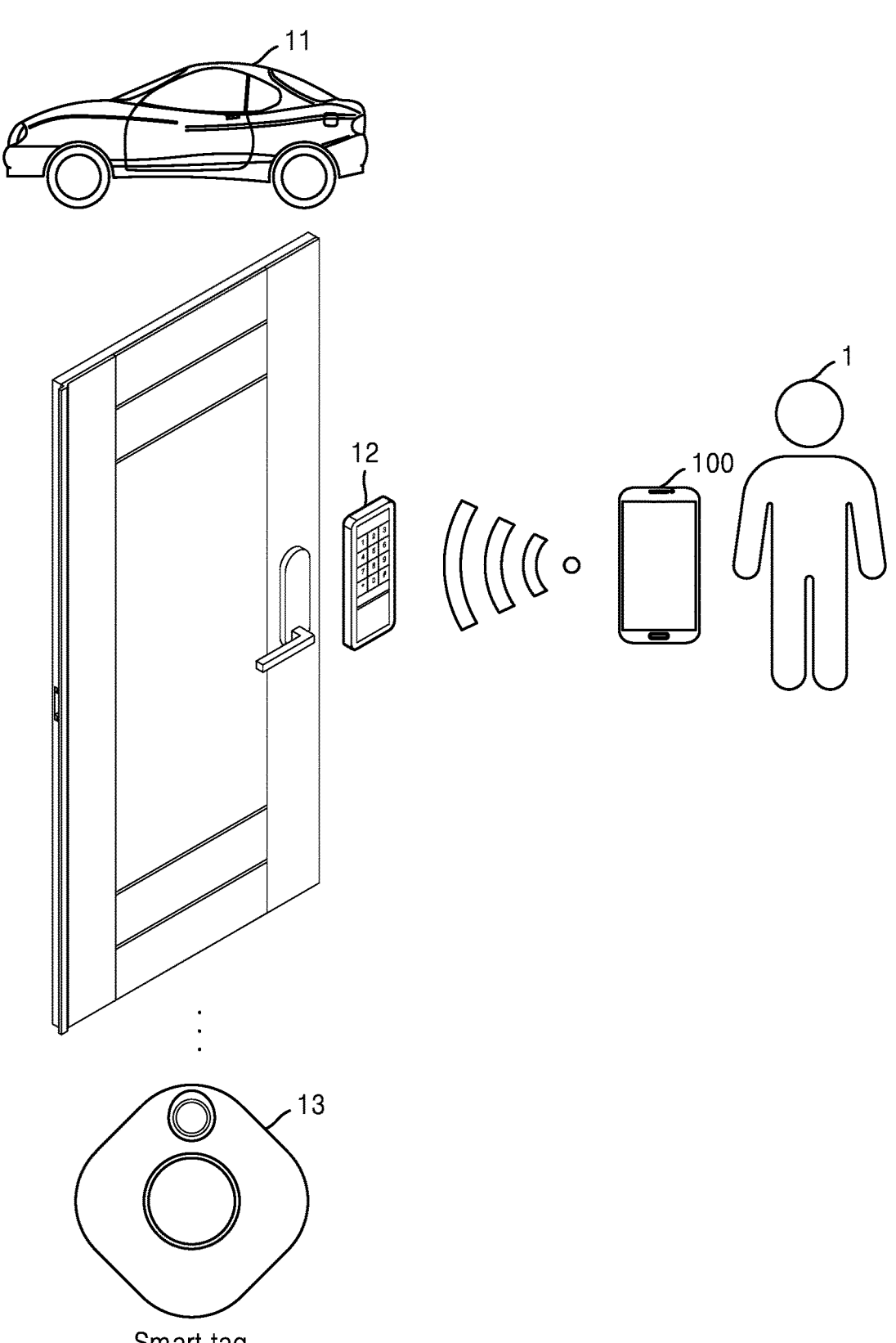
FIG. 1 is a diagram for describing a system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in order to clearly describe the disclosure, portions that are not relevant to the description of the disclosure are omitted, and similar reference numerals are assigned to similar elements throughout the specification. Connection lines or connection members between components illustrated in the drawings are merely of functional connections and/or physical or circuit connections. Various alternative or additional functional connections, physical connections, or circuit connections between components may be implemented in a practical device.

Although the terms used herein are generic terms, which are currently widely used and are selected by taking into consideration functions thereof, the meanings of the terms may vary according to intentions of those of ordinary skill in the art, legal precedents, or the advent of new technology. Thus, the terms should be defined not by simple appellations thereof but based on the meanings thereof and the context of descriptions throughout the disclosure. In addition, terms such as 'first' or 'second' may be used to describe various elements, but the elements should not be limited by the terms. These terms are only used to distinguish one element from another element. As used herein, phrases such as "in an embodiment" does not necessarily indicate the same embodiment. In addition, as used herein, the expression "include at least one of a, b or c" may mean "include only a", "include only b", "include only c", "include a and b", "include b and c", "include a and c", or "include a, b, and c".

An embodiment of the disclosure may be represented by functional block components and various processing operations. Some or all of the functional blocks may be implemented by any number of hardware and/or software elements that perform particular functions. For example, the functional blocks of the disclosure may be embodied by at least one microprocessor or by circuit components for a certain function. In addition, for example, the functional blocks of the disclosure may be implemented by using various programming or scripting languages. The functional blocks may be implemented by using various algorithms executable by one or more processors. Furthermore, the disclosure may employ known technologies for electronic settings, signal processing, and/or data processing.

Throughout the specification, the term "user" may refer to a user of an electronic device. Throughout the specification, the term 'service' may refer to a function or operation performed by an electronic device. The kinds and types of services may vary depending on the electronic device. For example, in a case in which the electronic device is a car, a service may refer to a function of checking the state of the car, a function of accessing a program installed in the car, or a function of sharing a file in a storage space of the car. In a case in which the electronic device is a home appliance, a service may refer to a function of turning the home appliance on/off, or controlling the home appliance to perform a particular operation. The kinds and types of services are not limited to the above examples and may refer to all functions or operations performed by the electronic device.

Throughout the specification, the term 'application' refers to a set of computer programs designed to perform a particular function or operation. Without being limited thereto, an application may refer to a function or operation performed by an electronic device, such as the above-mentioned service. Applications described herein may vary depending on the type of the electronic device. For example, examples of applications may include an application for controlling an operation such as turning the electronic device on/off, a game application, a video playback application, a map application, a memo application, a calendar application, a phone book application, a broadcasting application, an exercise support application, a payment application, a photo folder application, a file management application, a file sharing application, and the like. The kinds and types of applications are not limited thereto. The term 'application' may be expressed as 'app'. In addition, the terms 'service' and 'application' may be used interchangeably throughout the specification.

FIG. 1 is a diagram of a system according to an embodiment of the disclosure.

FIG. 1 illustrates an electronic device 100, a user 1 of the electronic device 100, and target devices 11, 12, and 13 for performing control and access by using the electronic device 100. Any one of the target devices 11, 12, and 13 may correspond to a second electronic device to be described below.

The electronic device 100 may include a personalized mobile device, but is not limited thereto, and may be any one of various types of electronic devices. For example, the electronic device 100 may include a smart phone, a tablet personal computer (PC), a PC, a camera, a wearable device, etc. In an embodiment of the disclosure, the electronic device 100 may determine a service or an application for controlling and accessing the target devices 11, 12, and 13, and control the target devices 11, 12, and 13 to perform the determined service or application.

The target devices 11, 12, and 13 may interact with the electronic device 100 to execute a service or an application that performs a certain operation or function.

The electronic device 100 and the target devices 11, 12, . . . , 13 within a certain distance may perform pairing and interact with each other through a short-range communication method such as UWB, to execute a service or an application that performs a certain operation or function. UWB may denote a short-range, high-speed, wireless communication technique using a wide frequency band greater than or equal to several GHz, low spectrum density, and a narrow pulse width (1 nsec to 4 nsec), in a baseband state. UWB may also refer to a band to which UWB communication is applied. Hereinafter, a ranging method performed among electronic devices will be described based on a UWB communication method; however, this is only an example, and in practice, various wireless communication techniques may be used. For example, in addition to UWB, wireless communication techniques such as Wi-Fi, Bluetooth, Bluetooth Low Energy (BLE), Wi-Fi Direct (WFD), near-field communication (NFC), or Zigbee may be used.

In a case in which a target device is a car 11, a user may interact with the car 11 through the electronic device 100 to select and execute a service or an application to be performed by the car 11. The electronic device 100 may select service or applications that are executable by the car 11 by using information about the car 11, and provide the user with the selected services or applications, and the user may select a service or an application to be executed by the car 11 through the electronic device 100. The electronic device 100 may transmit information about the service or application selected by the user to the car 11, and the car 11 may execute the service or application selected by the user. The user may control an operation of the car 11 by selecting a service or an application associated with the car 11 through the electronic device 100. For example, the user may open and close a door of the car 11, start the car 11, or control various electronic devices mounted on the car, through the electronic device 100. Furthermore, the user may control operations related to autonomous driving, such as an automatic parking system, through the electronic device 100. In addition, in a case in which the target device is a door lock 12, the user may open and close a locking device of the door lock 12 through a service or an application stored in the electronic device 100. In a case in which the target device is a smart tag 13, the user may recognize the location of the smart tag 13 or select and execute various services or applications associated with the smart tag 13, through the electronic device 100.

The embodiment of the disclosure illustrated in FIG. 1 is merely an example, and the scope of the disclosure is not limited to the examples illustrated in FIG. 1. For example, there may be various target devices in addition to the target devices 11, 12, and 13 illustrated in FIG. 1. The target devices 11, 12, and 13 may be internet-of-Things (IoT) devices capable of performing short-range wireless communication with the electronic device 100. The IoT devices may include various devices such as smart phones, wearable devices, tablet computers, laptop computers, desktop computers, workstations, servers, smart speakers, home appliances, furniture, fitness equipment, crime prevention devices, sensors, meters, robots, office equipment, medical equipment, manufacturing devices, or transportation vehicles. The IoT devices may include various devices used in home or building automation systems, various industrial automation systems for an office, agriculture, manufacturing, distribution, sales, transportation, finance or the like, energy or environmental systems, smart cities, and the like. Hereinafter, the term 'electronic device' may include IoT devices unless otherwise specified.

Figure 2:
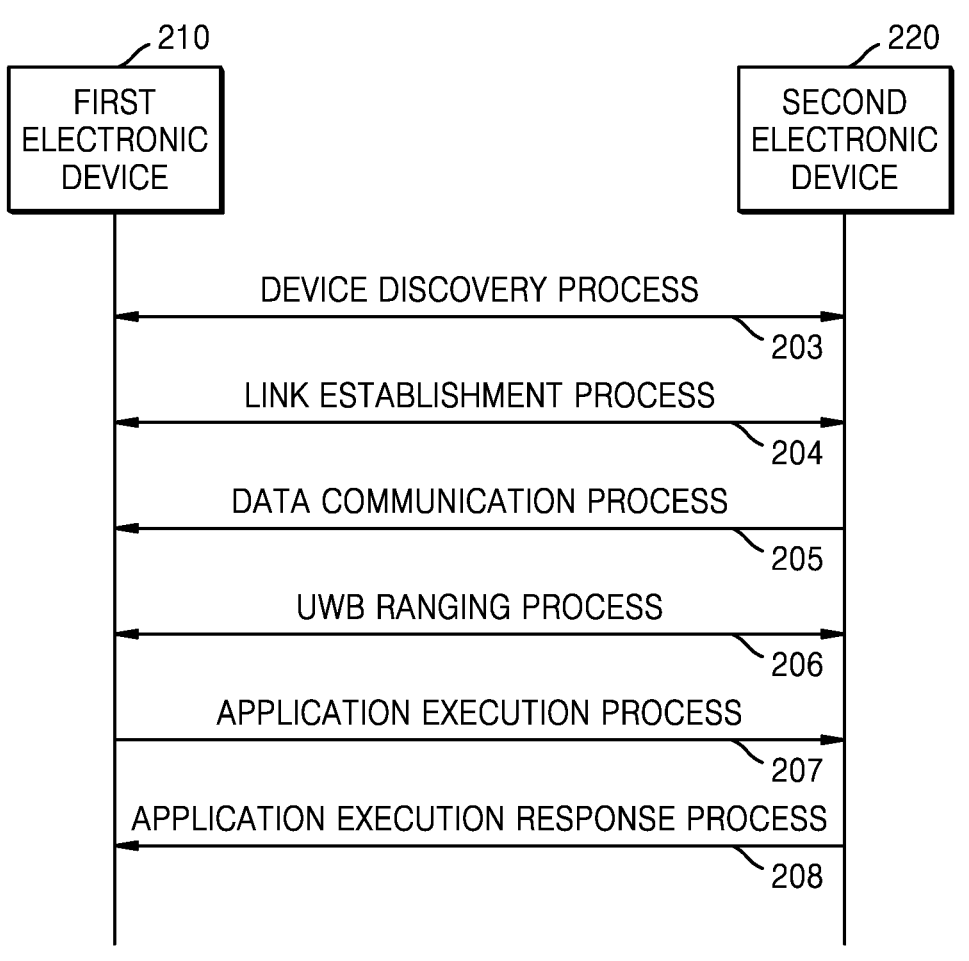
FIG. 2 is a diagram illustrating a communication process of a plurality of electronic devices, according to an embodiment of the disclosure.

FIG. 2 is a diagram illustrating a communication process of a plurality of electronic devices, according to an embodiment of the disclosure.

Referring to FIG. 2, a first electronic device 210 and a second electronic device 220 may perform communication with each other through a device discovery process 203, a link establishment process 204, and a data communication process 205.

In the device discovery process 203, each of the first electronic device 210 and the second electronic device 220 may search for other electronic devices capable of performing device-to-device (D2D) communication among nearby electronic devices. Through this, each of the first electronic device 210 and the second electronic device 220 may determine whether to establish a link for D2D communication. For example, the first electronic device 210 and the second electronic device 220 may transmit a search signal for searching for other electronic devices, and discover a counterpart device in response to receiving a response signal transmitted from an electronic device that has received the search signal. In addition, the first electronic device 210 may receive a response signal transmitted by the second electronic device 220, and thus confirm that the second electronic device 220 capable of performing D2D communication is within a D2D communication range.

In the link establishment process 204, each of the first electronic device 210 and the second electronic device 220 may establish a link for data transmission to an electronic device to which data is to be transmitted, among the electronic devices discovered in the device discovery process 203. For example, the first electronic device 210 may establish a link for data transmission to the second electronic device 220 discovered in the device discovery process 203. A wireless connection process of the first electronic device 210 and the second electronic device 220 through the device discovery process 203 and the link establishment process 204 may be referred to as pairing.

In the data communication process 205, each of the first electronic device 210 and the second electronic device 220 may transmit and receive data to and from devices for which links are established in the link establishment process 204. For example, the first electronic device 210 may transmit and receive data to and from the second electronic device 220 through the link established in the link establishment process 204.

According to an embodiment of the disclosure, in the data communication process 205, the second electronic device 220 may transmit, to the first electronic device 210, information about the second electronic device 220 including identification information of the second electronic device 220, information about a communication protocol available in the second electronic device 220, and information about a wireless communication method available in the second electronic device 220. The identification information of the second electronic device 220 may be unique identifier (ID) information of the second electronic device 220 to distinguish the second electronic device 220 from other electronic devices. The communication protocol refers to a system of formats and rules for exchange of messages between the second electronic device 220 and an external electronic device. Examples of communication protocols include Hypertext Transfer Protocol (HTTP), Hypertext Transfer Protocol Secure (HTTPS), File Transfer Protocol (FTP), Secure File Transfer Protocol (SFTP), Telnet (TErminaL NETwork), Post Office Protocol version 3 (POP3), Simple Mail Transfer Protocol (SMTP), Secure Shell (SSH), Secure Socket Layer (SSL), Simple Object Access Protocol (SOAP), and Address Resolution Protocol (ARP), but are not limited thereto. Examples of wireless communication methods include, but are not limited to, Wi-Fi, Bluetooth, BLE, WFD, UWB, NFC, and Zigbee.

In a UWB ranging process 206, UWB ranging to measure the distance and direction between the first electronic device 210 and the second electronic device 220 may be performed. For example, in a case in which the first electronic device 210 is a smart phone storing a digital key of a vehicle, and the second electronic device 220 is the vehicle, the distance between the smart phone and the vehicle may be measured by using a plurality of UWB communication modules installed in the smart phone and the vehicle, and then based on the measurement result, when the vehicle and the smart phone get closer to each other within a certain distance or less, the vehicle door may be automatically opened, and thus, user convenience may be improved. The vehicle and the smart phone may perform multicast ranging or broadcast ranging. According to an embodiment of the disclosure, the UWB ranging process 206 may be omitted.

The electronic device may perform ranging by using a ranging frame (RFRAME) and a ranging control frame. Two device types related to ranging control may be referred to as "controller" or "controllee".

First, the controller may be defined as a device that defines and controls ranging parameters by transmitting a ranging control frame along with a ranging control information element (IE). The ranging control frame is used to set ranging parameters to be used for ranging. The term "ranging control frame" may be referred to as "ranging control message".

The controllee may be defined as a device that uses ranging parameters received from the controller. At least one controllee may be managed by the controller. A method of determining a role of a device (e.g., to serve as a controller or a controllee) and selecting ranging parameters may be implemented in various ways.

In addition, the two device types for ranging control may be referred to as "initiator" or "responder". The initiator is a device that starts ranging by transmitting a poll. The responder is a device that responds to the poll received from the initiator.

The controller may determine devices to participate in ranging and their types by using ranging an initiator/responder list (IRL) IE or a ranging scheduling (RS) IE. The IRL IE and the RS IE may be carried by a ranging control frame. For scheduling-based ranging, the RS IE may be configured by the controller to manage resources and indicate roles of devices (i.e., the role of an initiator or responder). The IRL IE may be used in contention-based ranging to determine roles of devices when not using the RS IE.

A schedule mode field of the ranging control IE indicates whether the ranging frame is transmitted by using contention or by using a schedule. Devices that are not specified by these IEs cannot participate in the ranging. When transmission of a poll frame by a device is required, the device type of the device may be determined as an initiator, while a device responding to the poll frame may be determined as a responder.

In contention-based multicast/broadcast ranging, when the controller is the only initiator in the ranging, and a destination address field in the medium access control (MAC) header of the ranging control frame specifies a responder, the controller may not add an IRL IE to the ranging control frame.

Because the ranging control frame includes an IRL IE or an RS IE, the controller may receive the ranging control frame to identify whether to transmit a poll. In a case in which the device type of the controller is designated as an initiator within the IRL IE or RS IE, the controller may transmit a poll frame. Each of the controller and the controllee may serve as an initiator or a responder. Any one of the first electronic device 210 and the second electronic device 220 may serve as a controller and the other may serve as a controllee.

In an application execution process 207, the first electronic device 210 may determine applications executable by the second electronic device 220, based on information about the second electronic device 220 received from the second electronic device 220, for example, identification information of the second electronic device 220, information about a communication protocol available in the second electronic device 220, and information about a wireless communication method available in the second electronic device 220. A list of applications executable by the second electronic device 220 may be provided to the user through a display of the first electronic device 210, and the user may select an application to be executed by the second electronic device 220. Information about the application selected by the user may be transmitted from the first electronic device 210 to the second electronic device 220, and the second electronic device 220 that has received the information about the application may execute the application independently or by interacting with the first electronic device 210.

In an application execution response process 208, the second electronic device 220 may transmit a response message including information about whether the application information transmitted from the first electronic device 210 is received, or information about a result of executing the application according to the transmitted application information.

Figure 3:
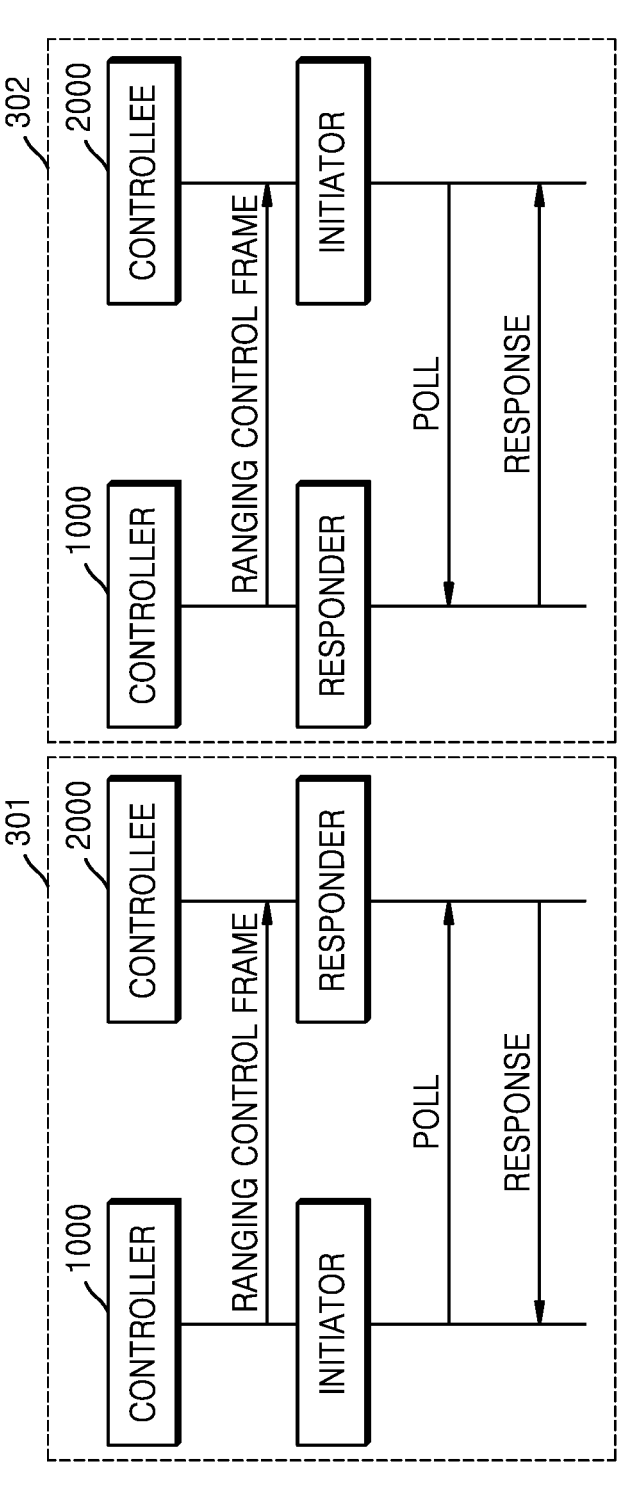
FIG. 3 illustrates an example of single-sided two-way ranging (SS-TWR) using a ranging control frame, according to an embodiment of the disclosure.

FIG. 3 illustrates an example of single-sided two-way ranging (SS-TWR) using a ranging control frame, according to an embodiment of the disclosure.

Referring to FIG. 3, in a case in which a controller 1000 sets the controller 1000 to transmit a poll frame as illustrated in a flowchart 301 of FIG. 3, the controller 1000 may serve as an initiator and transmit the poll frame. On the other hand, in a case in which the controller 1000 sets a controllee 2000 to transmit a poll frame as illustrated in a flowchart 302 of FIG. 3, the controllee 2000 may serve as an initiator and transmit the poll frame.

In addition, the ranging control frame may include a ranging acknowledgment IE indicating a ranging response type. A plurality of controllees may be used for multicast/broadcast/many-to-many (M2M) ranging.

The device according to an embodiment of the disclosure may perform ranging in units of ranging blocks.

The ranging block refers to a period for ranging. The ranging block includes a plurality of ranging rounds. The ranging round refers to a period required for completing one range measurement cycle between a pair of ranging devices participating in a ranging exchange. The ranging round includes a plurality of ranging slots. The ranging slot refers to a period for transmitting one ranging frame.

Figure 4:
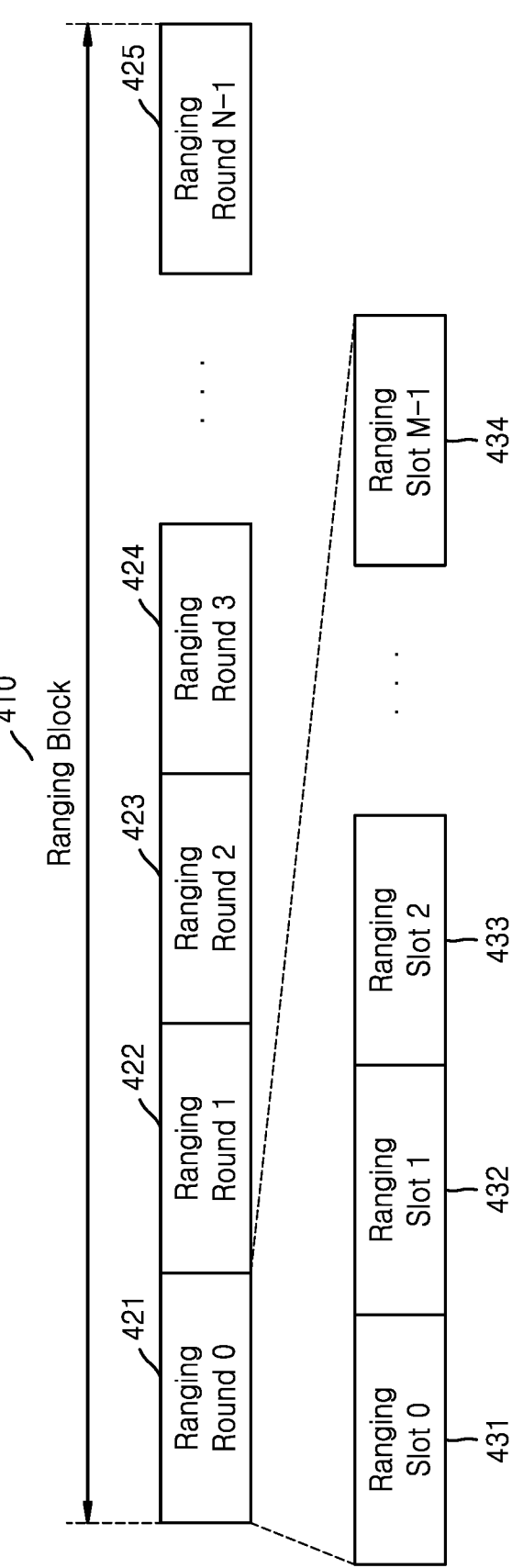
FIG. 4 illustrates a ranging block structure for ultra-wideband (UWB) ranging, according to an embodiment of the disclosure.

FIG. 4 illustrates a ranging block structure for UWB ranging, according to an embodiment of the disclosure.

Referring to FIG. 4, a ranging block 410 may include N ranging rounds 421, 422, 423, 424, and 425. In each ranging block, the ranging round 421 may include M ranging slots 431, 432, 433, and 434.

According to various embodiments of the disclosure, two types of ranging modes (e.g., an interval-based mode or a block-based mode) may be used for access control. The block-based mode uses a strict time structure, while the interval-based mode does not. The controller 1000 may select one from among the modes and specify the selected mode by using a time structure indicator of a ranging control IE.

In the block-based mode, a ranging block structure using a timeline that is set at certain intervals is used.

In the block-based mode, the ranging block structure may be determined based on a ranging block duration field, a ranging round duration field, and a ranging slot duration field, which are included in information about ranging control. According to an embodiment of the disclosure, the information about ranging control may be an advanced ranging control IE.

When the device receives a ranging control message (RCM), the device may set a structure of a ranging block and a relevant timeline for ranging by using field values of a ranging control IE included in the RCM. In addition, according to an embodiment of the disclosure, the ranging block structure may be set by a next higher layer.

The controller may repeatedly transmit the ranging block structure in all ranging control messages. When the ranging block structure is changed or needs to be updated, the controller may transmit a ranging block update (RBU) IE including fields related to a ranging block update.

In addition, index values of respective ranging rounds within the ranging block may be set to sequentially increase from the first ranging round within the ranging block. Referring to FIG. 4, in a case in which the ranging block 410 includes N ranging rounds 421, 422, 423, 424, and 425, the index of the first ranging round 421 of the ranging block 410 may be 0, and the index of the last ranging round 425 of the ranging block 410 may be N−1.

In addition, index values of respective ranging slots within the ranging round may be set to sequentially increase from the first ranging slot within the ranging round. Here, for example, in a case in which the first ranging round 421 includes M ranging slots 431, 432, 433, and 434, the index of the first ranging slot 431 of the ranging round 421 may be 0, and the index of the last ranging slot 434 of the ranging round 421 may be M−1.

Figure 5:
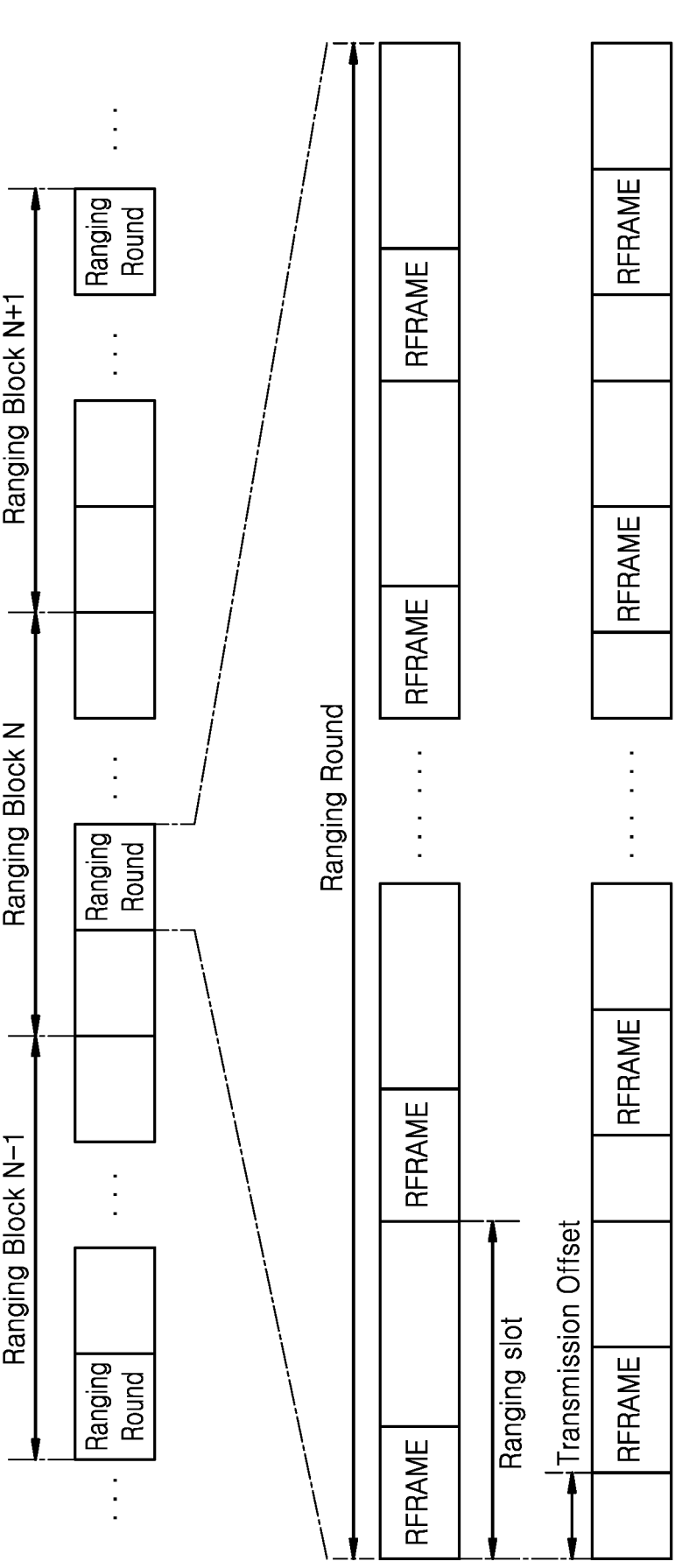
FIG. 5 illustrates a timing diagram for a block-based mode according to an embodiment of the disclosure.

FIG. 5 illustrates a timing diagram for a block-based mode according to an embodiment of the disclosure.

Referring to FIG. 5, index values of respective ranging blocks may be set to sequentially increase from the first ranging block. Here, for example, the index value of the first ranging block may be N−1, and the index values of the respective ranging blocks may be set to increase by 1.

FIG. 5 illustrates a plurality of ranging rounds included in ranging block N with an index value of N. Each ranging round may include a plurality of ranging slots. A ranging frame may be transmitted within a ranging slot. In addition, the ranging frame may have a transmission offset set therein, and be transmitted in the ranging slot. The ranging frame refers to a frame transmitted and received between devices to perform ranging. For example, the ranging frame may be a frame that includes a ranging marker, which is information for defining a reference time point.

In the above-mentioned UWB ranging process, the distance between two electronic devices may be measured through single-sided two-way ranging (SS-TWR) and/or double-sided two-way ranging (DS-TWR).

Figure 6:
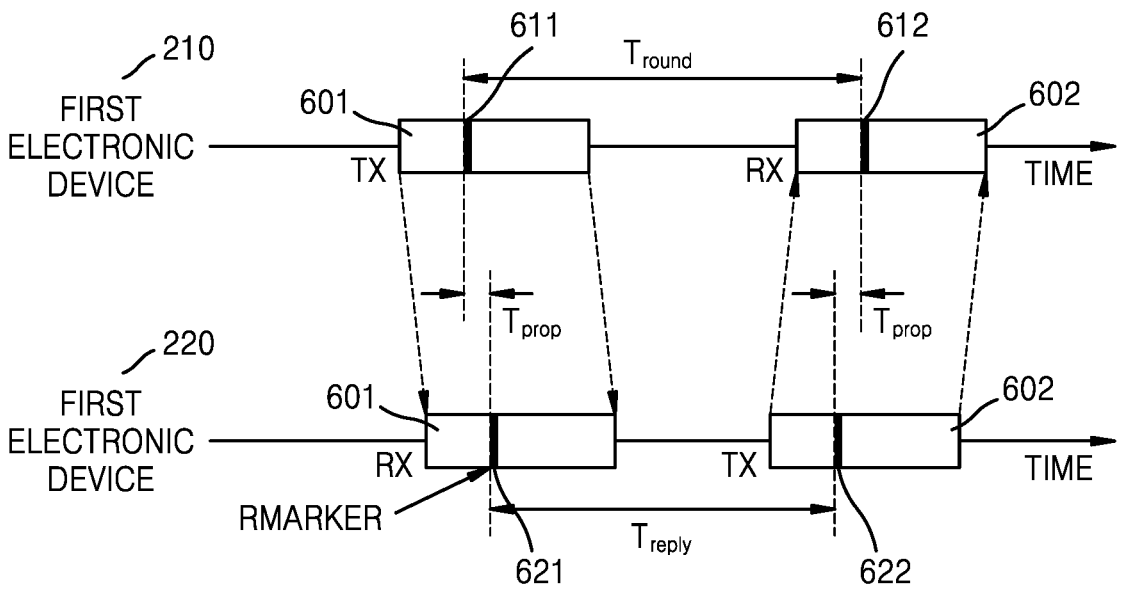
FIG. 6 is a diagram schematically illustrating an SS-TWR ranging operation of electronic devices, according to an embodiment of the disclosure.

FIG. 6 is a diagram schematically illustrating an SS-TWR ranging operation of electronic devices, according to an embodiment of the disclosure.

Referring to FIG. 6, the first electronic device 210 may be referred to as an initiator device, and the second electronic device 220 may be referred to as a responder device.

Referring to FIG. 6, when the first electronic device 210 transmits a first RFRAME 601 to the second electronic device 220, the second electronic device 220 may measure a time point of reception of the first RFRAME 601. The second electronic device 220 may transmit a second RFRAME 602 to the first electronic device 210 and measure a ranging response time period $T_{reply}$. The first electronic device 210 that has received the second RFRAME 602 may measure a time point of reception of the second RFRAME 602 and measure a ranging round time period $T_{round}$.

In detail, the first electronic device 210 may measure, as $T_{round}$, a time period between a 1st-1 RMARKER 611 included in the first RFRAME 601 transmitted to the second electronic device 220, and a 1st-2 RMARKER 612 included in the second RFRAME 602 received from the second electronic device 220. The second electronic device 220 may measure, as $T_{reply}$, a time period between a 2nd-1 RMARKER 621 included in the first RFRAME 601 received from the first electronic device 210 and, and a 2nd-2 RMARKER 622 included in the second RFRAME 602 transmitted to the first electronic device 210.

The second electronic device 220 may transmit the $T_{reply}$ value to the first electronic device 210 by using a data frame, such that the first electronic device 210 calculates a time of flight (ToF) $T_{prop}$ according to Equation 1 below. The first electronic device 210 may perform distance estimation (ranging) between the first electronic device 210 and the second electronic device 220 by multiplying $T_{prop}$ by the speed of light (e.g., $3^{\times 10^8}$ m/s).

$$\hat{T}_{prop} = \frac{1}{2}(T_{round} - T_{reply}) \qquad \text{Equation 1}$$

Figure 7:
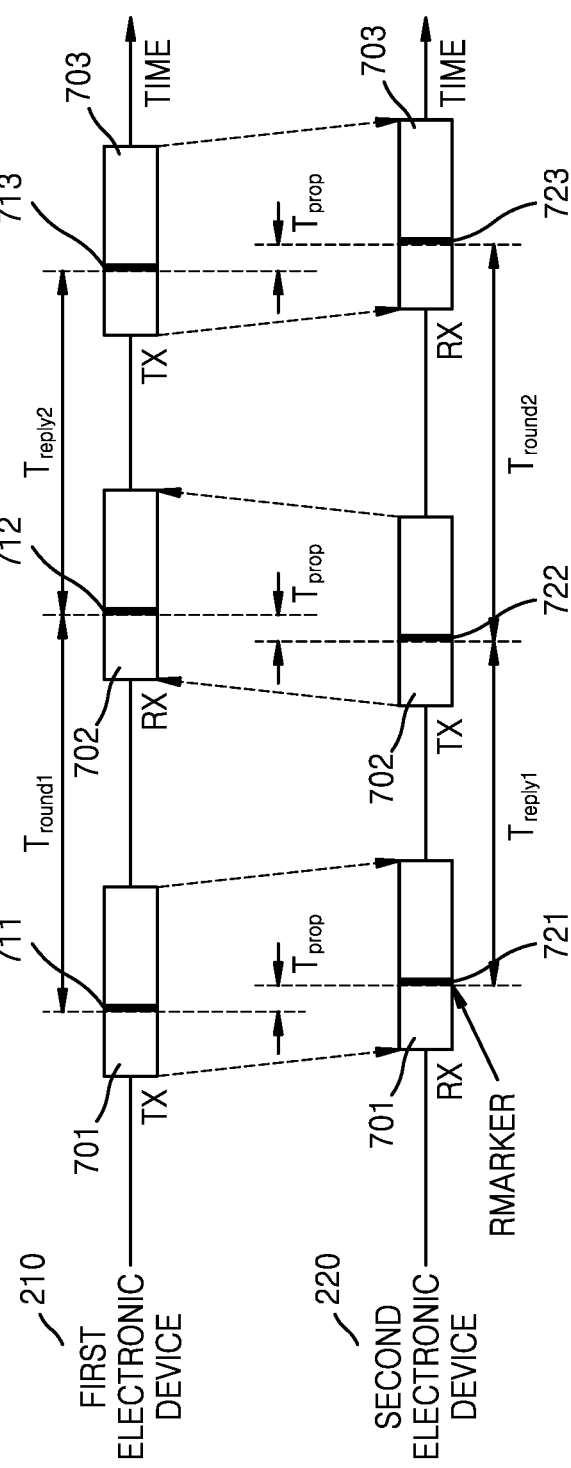
FIG. 7 is a diagram schematically illustrating a double-sided two-way ranging (DS-TWR) operation of electronic devices, according to an embodiment of the disclosure.

FIG. 7 is a diagram schematically illustrating a DS-TWR operation of electronic devices, according to an embodiment of the disclosure.

In FIG. 7, the first electronic device 210 may be referred to as an initiator device, and the second electronic device 220 may be referred to as a responder device.

DS-TWR may be performed through three RFRAME transmissions by using a method similar to the SS-TWR described above.

Referring to FIG. 7, when the first electronic device 210 transmits a first RFRAME 701 to the second electronic device 220, the second electronic device 220 may measure a time point of reception of the first RFRAME 701. The second electronic device 220 may transmit a second RFRAME 702 to the first electronic device 210. The second electronic device 220 may measure a ranging response time period $T_{reply1}$. The first electronic device 210 that has received the second RFRAME 702 may measure a time point of reception of the second RFRAME 702 and measure a ranging round time period $T_{round1}$.

When the first electronic device 210 that has received the second RFRAME 702 transmits a third RFRAME 703 to the second electronic device 220, the second electronic device 220 may measure a time point of reception of the third RFRAME 703. The first electronic device 210 may measure a ranging response time period $T_{reply2}$. The second electronic device 220 that has received the third RFRAME 703 may measure a time point of reception of the third RFRAME 703 and a ranging round time period $T_{round2}$, through scrambled timestamp sequence (STS)-based first path detection.

In detail, the first electronic device 210 may measure, as $T_{round1}$, a time period between a 1st-1 RMARKER 711 included in the first RFRAME 701 transmitted to the second electronic device 220, and a 1st-2 RMARKER 712 included in the second RFRAME 702 received from the second electronic device 220. The second electronic device 220 may measure, as $T_{reply1}$, a time period between a 2nd-1 RMARKER 721 included in the first RFRAME 701 received from the first electronic device 210 and, and a 2nd-2 RMARKER 722 included in the second RFRAME 702 transmitted to the first electronic device 210.

The second electronic device 220 may measure, as $T_{round2}$, a time period between the 2nd-2 RMARKER 722 included in the second RFRAME 702 transmitted to the first electronic device 210 and, and a 2nd-3 RMARKER 723 included in the third RFRAME 703 received from the first electronic device 210. The first electronic device 210 may measure, as $T_{reply2}$, a time period between the 1st-2 RMARKER 712 included in the second RFRAME 702 received from the second electronic device 220 and, and a 1st-3 RMARKER 713 included in the third RFRAME 703 transmitted to the second electronic device 220.

The second electronic device 220 may receive $T_{round1}$ and $T_{reply2}$ from the first electronic device 210 by using a data frame. The second electronic device 220 may calculate $T_{prop}$ according to Equation 2 below, and measure the distance between the first electronic device 210 and the second electronic device 220 by multiplying $T_{prop}$ by the speed of light (e.g., $3 \times 10^6$ m/s).

$$\hat{T}_{prop} = \frac{(T_{round1} \times T_{round2} - T_{reply1} \times T_{reply2})}{(T_{round1} + T_{round2} + T_{reply1} + T_{reply2})} \qquad \text{Equation 2}$$

Parameters related to ranging are determined by an electronic device referred to as a controller and notified to an electronic device referred to as a controllee. The controllee may request the controller to change parameters related to ranging during a ranging measurement period through a ranging change request IE, but the controller finally determines whether to accept the request from the controllee. The parameters related to ranging may include parameters related to at least one of a ranging method indicating whether to use an SS-TWR method or a DS-TWR method, a ranging period, the number of frames used for ranging, or the number of STS segments included in one frame. In FIGS. 6 and 7, any one of the first electronic device 210 and the second electronic device 220 may serve as a controller, and the other may serve as a controllee.

Hereinafter, a process in which the first electronic device 210 determines applications executable by the second electronic device 220 based on information about the second electronic device 220 transmitted from the second electronic device 220 will be described in detail.

Figure 8:
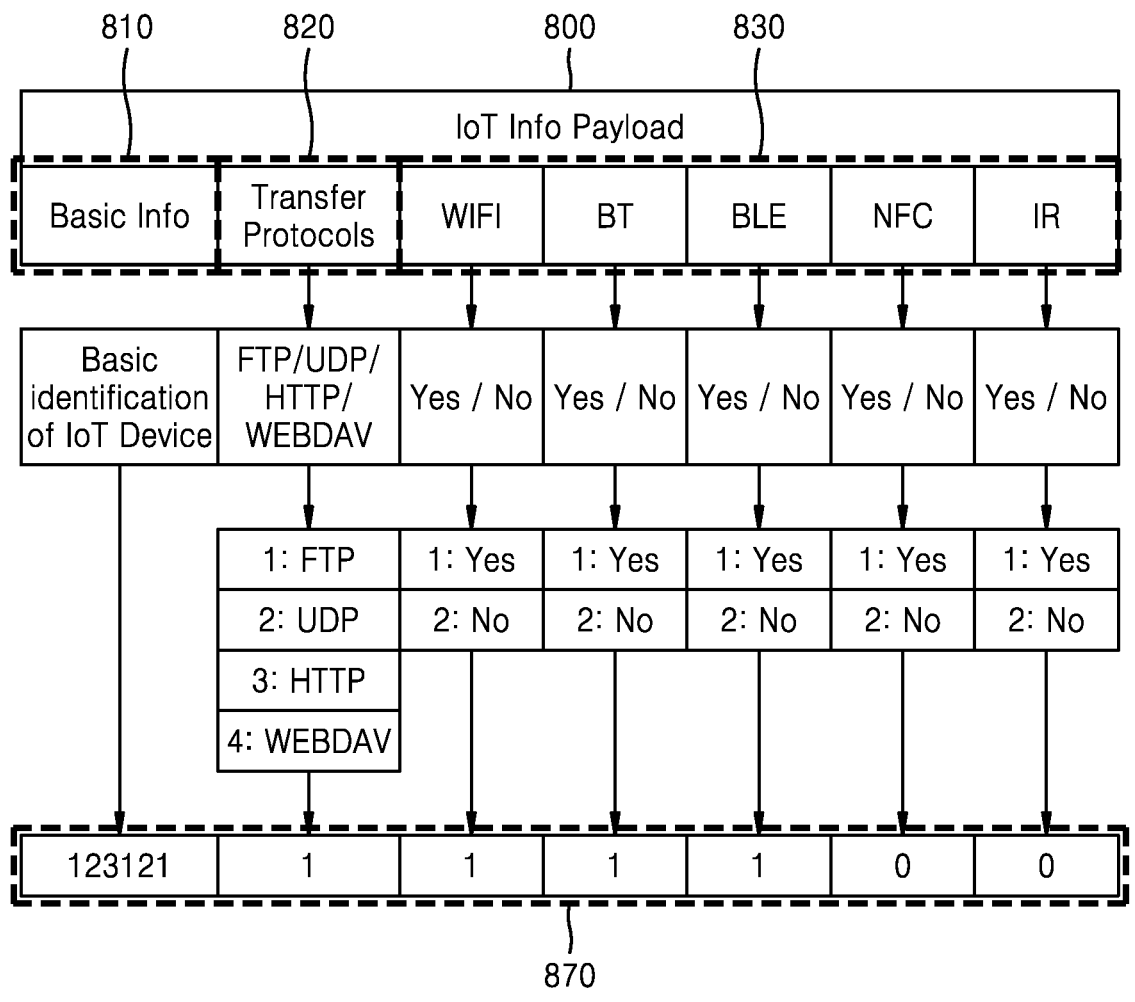
FIG. 8 is a diagram illustrating an example of information about a second electronic device transmitted from the second electronic device, according to an embodiment of the disclosure.

FIG. 8 is a diagram illustrating an example of information about the second electronic device 220 transmitted from the second electronic device 220, according to an embodiment of the disclosure.

Referring to FIG. 8, information 800 about the second electronic device 220 may include identification information 810 of the second electronic device 220, information 820 about a communication protocol supported by the second electronic device 220, and information 830 about a wireless communication method supported by the second electronic device 220. The information 800 about the second electronic device 220 may be included in a payload of data according to any one short-range communication method of Wi-Fi, Bluetooth, BLE, WFD, UWB, NFC, and Zigbee, and transmitted. For example, the second electronic device 220 may include the information 800 about the second electronic device 220 in a payload of a UWB physical layer (PHY) frame. The short-range communication method for transmitting the information 800 about the second electronic device 220 is not limited to the above examples and may be changed.

The identification information 810 of the second electronic device 220 is a unique ID assigned to the second electronic device 220 to distinguish the second electronic device from other electronic devices, and an ID value or a session ID value assigned by the first electronic device 210 in a process of establishing a link between the first electronic device 210 and the second electronic device 220, or a unique value assigned to the second electronic device 220, such as the MAC address of the second electronic device 220 may be used as the identification information 810 of the second electronic device 220.

The information 820 about the communication protocol is information about the communication protocol supported by the second electronic device 220, and may be a setting value for a communication protocol available in the second electronic device among setting values respectively assigned to a plurality of communication protocols. For example, in a case in which FTP is preset to 1, User Datagram Protocol (UDP) to 2, HTTP to 3, and Web Distributed Authoring and Versioning (WebDAV) to 4, the information 820 about the communication protocol may include a setting value for a communication protocol supported by the second electronic device 220.

The information 830 about the wireless communication method includes information about a wireless communication method supported by the second electronic device 220. The information 830 about the wireless communication method may include flag information indicating whether the second electronic device 220 supports or is able to use each of a plurality of preset wireless communication methods. Referring to FIG. 8, the wireless communication method supported by the second electronic device 220 may be signaled through a plurality of pieces of flag information indicating whether Wi-Fi, BT, BLE, NFC, and IR wireless communication methods are supported, respectively. For example, a flag for a wireless communication method supported by the second electronic device 220 may be set to 1, and the flag for a wireless communication method supported by the second electronic device 220 may be set to 0.

The first electronic device 210 that has received the information 800 about the second electronic device 220 may determine a communication protocol and a wireless communication method supported by the second electronic device 220, by using the identification information 810 of the second electronic device 220, the information 820 about the communication protocol supported by the second electronic device 220, and the information 830 about the wireless communication method supported by the second electronic device 220. For example, the first electronic device 210 that has received information 870 about the second electronic device 220 may determine that the second electronic device 220 with an ID "123121" uses an FTP communication protocol, supports wireless communication methods of Wi-Fi, BT, and BLE, and does not support wireless communication methods of NFC and IR.

FIG. 9A is a diagram illustrating an example of application information used by the first electronic device 210 to determine an application based on information about the second electronic device 220, according to an embodiment of the disclosure.

Referring to FIG. 9A, the first electronic device 210 may identify a communication protocol required for execution of each application or supported wireless communication methods by using application information including information about a communication protocol and a wireless communication method used in the application.

Referring to FIG. 9A, the first electronic device 210 may determine, based on application information 910, that an FTP communication protocol is used for executing application 1 (APP1), and wireless communication methods of Wi-Fi, BT, and BLE may be used. The application information may include not only information about applications installed in the first electronic device 210 but also information about applications that are not installed in the first electronic device 210. The application information may be included in an application installation file or may be obtained from an external server. The application information for identifying a communication protocol required to execute each application or a supported wireless communication method is not limited to the example illustrated in FIGS. 9A and 9B and may be modified.

FIG. 9B is a diagram illustrating an example of information about the second electronic device 220 transmitted from the second electronic device 220, according to an embodiment of the disclosure.

Referring to FIG. 9B, the first electronic device 210 may determine, from among applications, an application that supports a communication protocol supported by the second electronic device 220 or uses a wireless communication method supported by the second electronic device 220, by using application information including information about communication protocols and wireless communication methods used in the applications. The first electronic device 210 may determine at least one application that is executable by the second electronic device 220, by comparing information about communication protocols and wireless communication methods used in applications included in application information as illustrated in FIG. 9A, with information about communication protocols available in the second electronic device 220 and information about wireless communication methods available in the second electronic device 220, which are included in information about the second electronic device 220. For example, referring to FIGS. 9A and 9B, based on the information about the second electronic device 220 as illustrated in FIG. 9B, the first electronic device 210 may determine that the second electronic device 220 with an ID "123121" uses the FTP communication protocol and supports wireless communication methods of Wi-Fi, BT, and BLE. By using the application information of FIG. 9A, the first electronic device 210 determines, from among the applications, an application that uses a communication protocol and a wireless communication method available in the second electronic device 220. Because the second electronic device 220 currently has a transfer protocol value of 1 and thus supports the FTP communication protocol, the first electronic device 210 may determine that, among APP1, APP3, and APP5 that use the FTP communication protocol, APP1 and APP5 that use at least one of the wireless communication methods of Wi-Fi, BT, and BLE, which are supported by the second electronic device 220, are executable by the second electronic device 220.

FIGS. 10A, 10B, 10C, 10D, 10E, 10F, and 10G are diagrams illustrating examples of application lists displayed on the first electronic device 210, according to various embodiments of the disclosure.

Referring to FIGS. 10A to 10G, based on determining at least one application executable by the second electronic device 220 based on at least one of identification information, information about a communication protocol, or information about a wireless communication method of the second electronic device 220, the first electronic device 210 may display a list of the determined applications on a display of the first electronic device 210.

Figure 10A:
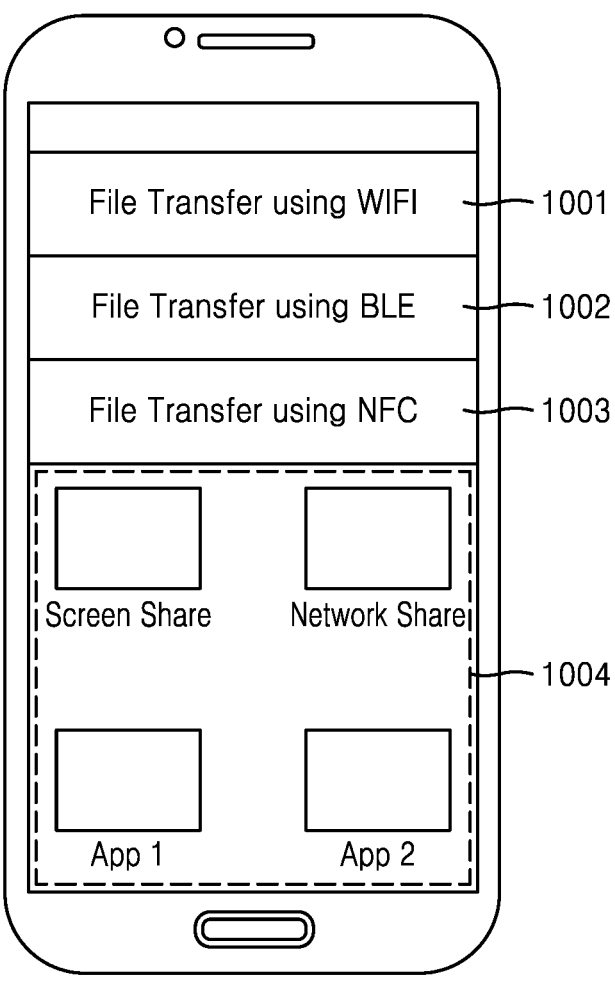
FIGS. 10A, 10B, 10C, 10D, 10E, 10F, and 10G are diagrams illustrating examples of application lists displayed on a first electronic device, according to various embodiments of the disclosure.

Referring to FIG. 10A, in a case in which the second electronic device 220 supports the wireless communication methods of Wi-Fi, BT, and BLE, and APP1 and APP2 are determined as applications executable by the second electronic device 220, the first electronic device 210 may display, on the display, file transfer services 1001, 1002, and 1003 using the wireless communication of Wi-Fi, BT, and BLE, and an application list 1004 including execution icons for APP1 and APP2. The user may select a desired application or service through the display, and the first electronic device 210 may execute the service or application selected by the user by interacting with the second electronic device 220. Based on at least one of the identification information, the information about the communication protocol, or the information about the wireless communication method of the second electronic device 220, all applications executable by the second electronic device 220 may be displayed on the first electronic device 210 for direct access to the applications.

A separate identification mark may be added to the application executable by the second electronic device 220 and displayed.

Figure 10B:
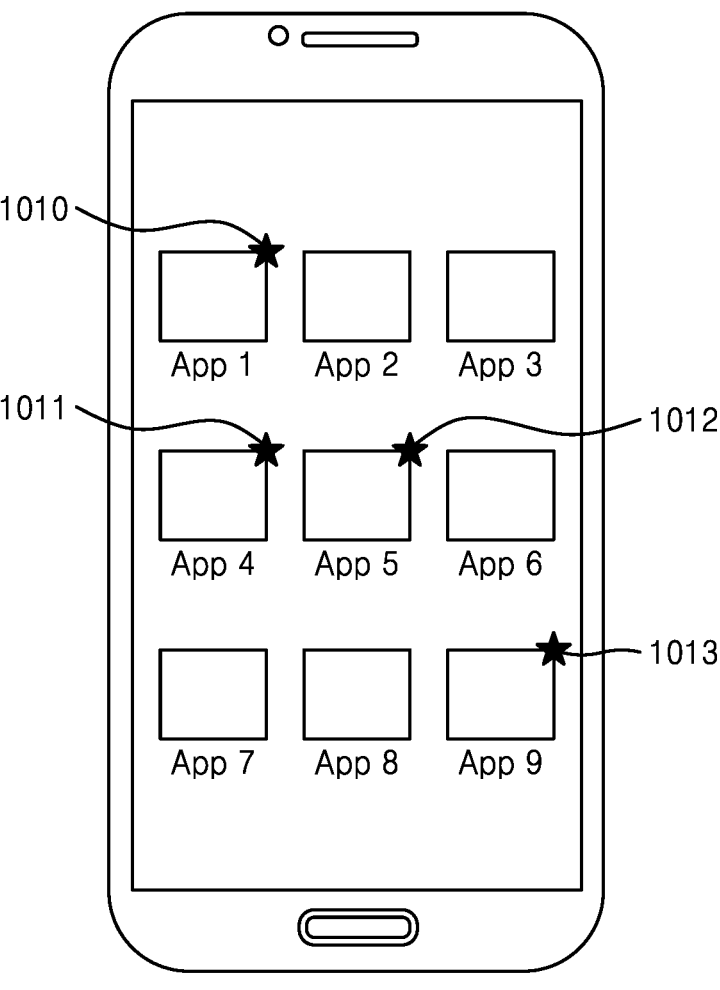

Referring to FIG. 10B, in a case in which, among applications installed in the first electronic device 210, APP1, APP4, APP5, and APP9 are executable by the second electronic device 220, the first electronic device 210 may add and display identification marks 1010, 1011, 1012, and 1013 to the applications APP1, APP4, APP5, and APP9 that are executable by the second electronic device 220 among the installed applications, such that the applications executable by the second electronic device 220 are distinguished.

The first electronic device 210 may identify the second electronic device 220 based on the identification information of the second electronic device 220, and display information about an application previously executed in relation to the identified second electronic device 220. In addition, the first electronic device 210 may display information about applications that have been frequently executed by other users in relation to the identified second electronic device 220.

Figure 10C:
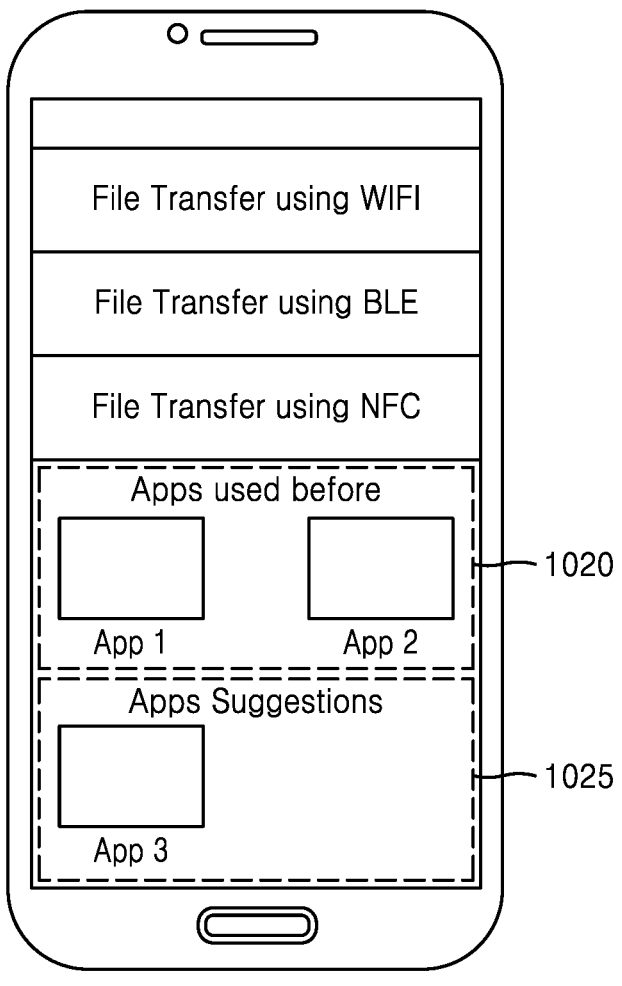

Referring to FIG. 10C, in a case in which, among the applications installed in the first electronic device 210, APP1 and APP2 are previously executed in relation to the second electronic device 220, the first electronic device 210 may display information 1020 about a list of the applications previously executed in relation to the second electronic device 220. In addition, the first electronic device 210 may display information 1025 about a suggested application for the applications that have been frequently executed by other users in relation to the identified second electronic device 220. In a case in which the suggested application is not installed in the first electronic device 210, and the user selects the suggested application, the first electronic device 210 may download the suggested application from an external server and install it.

The first electronic device 210 may identify the type and kind of the second electronic device 220 based on the identification information of the second electronic device 220, and display information about services or applications suitable for the identified type and kind of the second electronic device 220.

Figure 10D:
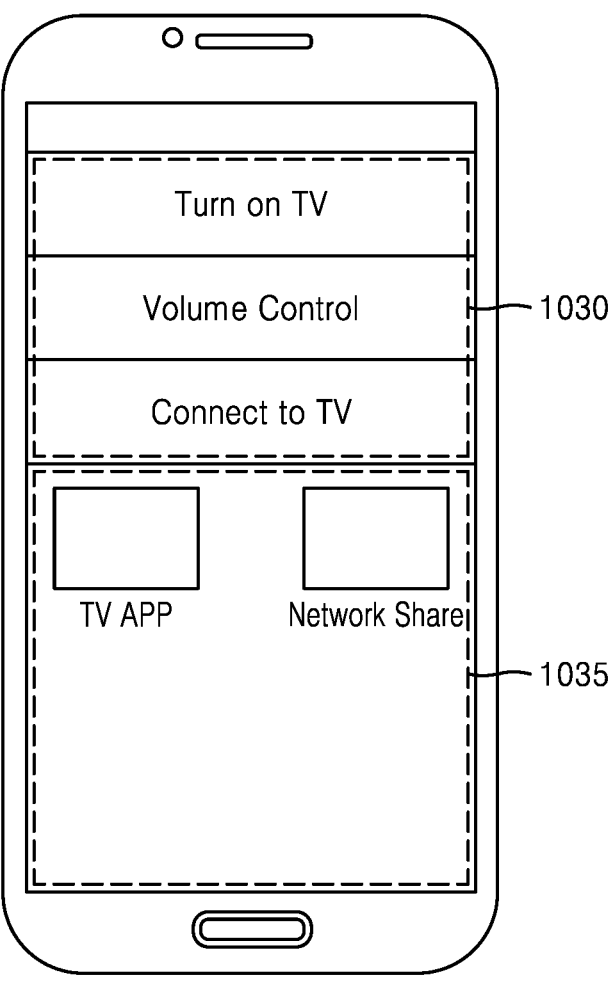

Referring to FIG. 10D, in a case in which the identified second electronic device 220 is a television (TV), the first electronic device 210 may display control commands 1030 for controlling the second electronic device 220, and a list 1035 of applications executable by or associated with the second electronic device 220.

Figure 10E:
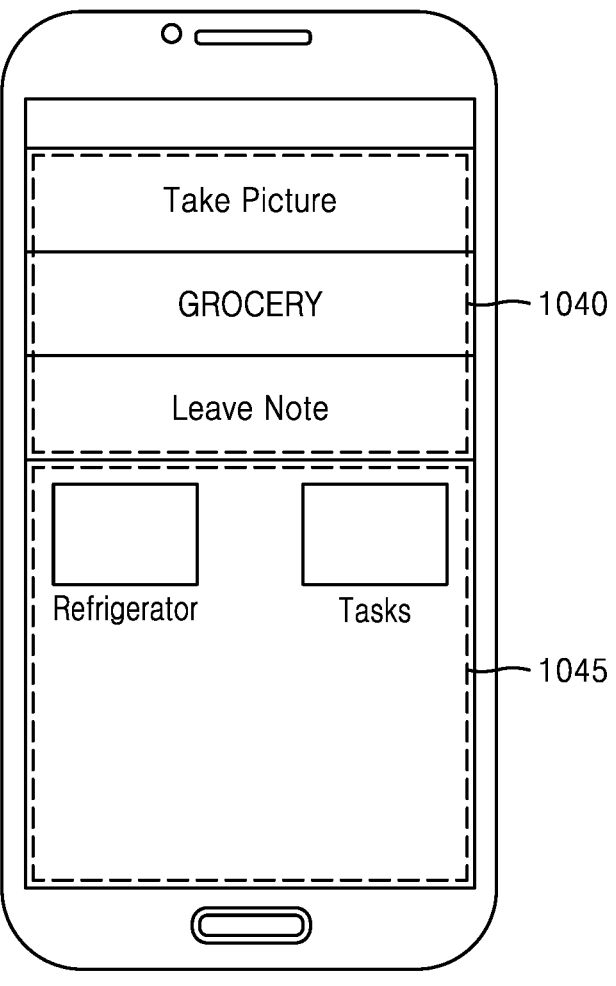

Referring to FIG. 10E, in a case in which the identified second electronic device 220 is a smart refrigerator, the first electronic device 210 may display control commands 1040 for controlling the second electronic device 220, and a list 1045 of applications executable by the second electronic device 220.

Figure 10F:
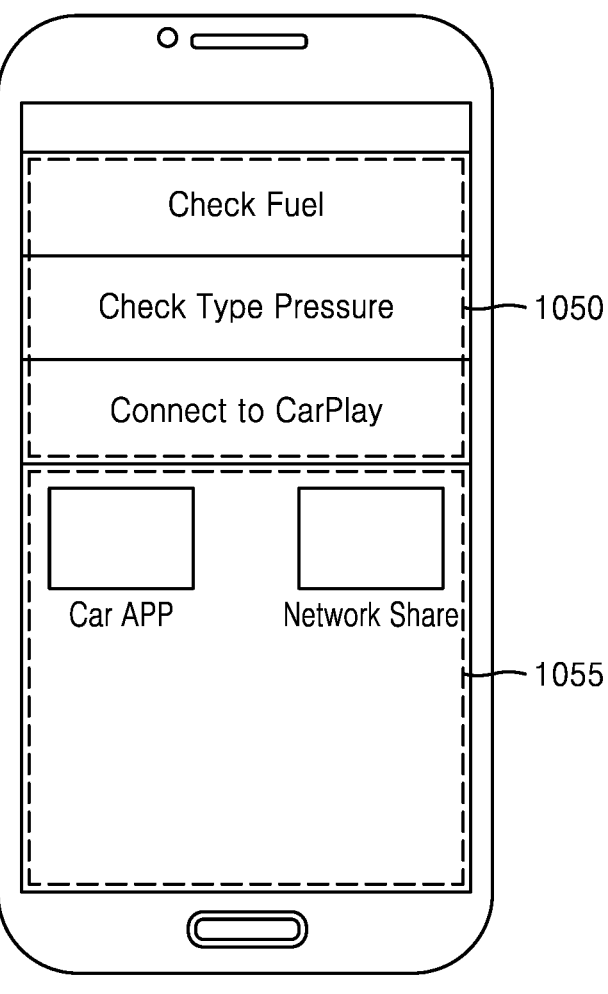

Referring to FIG. 10F, in a case in which the identified second electronic device 220 is a vehicle, the first electronic device 210 may display control commands 1050 for controlling the second electronic device 220, and a list 1055 of applications executable by or associated with the second electronic device 220.

Figure 10G:
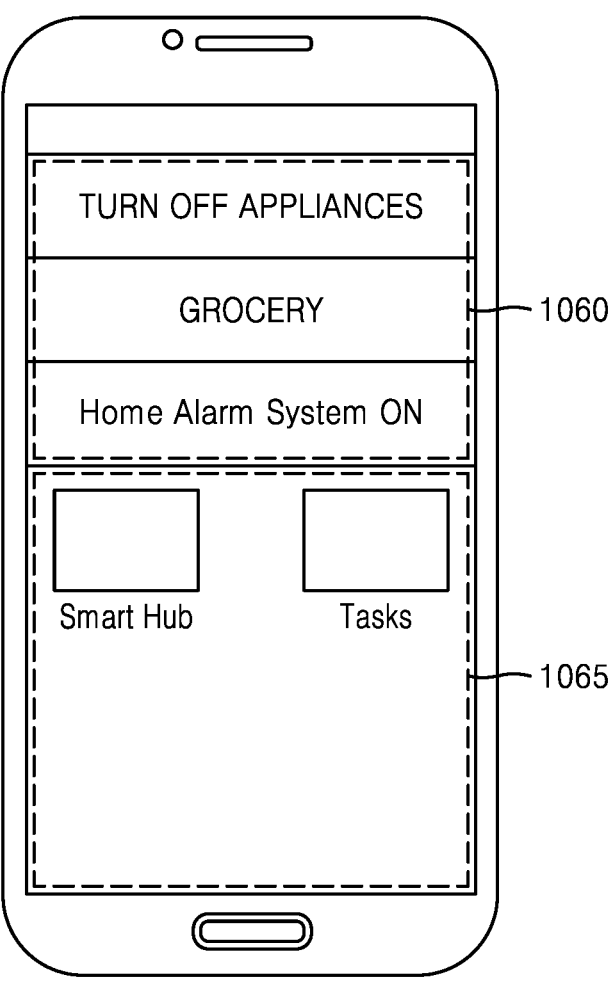

Referring to FIG. 10G, in a case in which the identified second electronic device 220 is a home appliance, the first electronic device 210 may display control commands 1060 for controlling the second electronic device 220, and a list 1065 of applications executable by or associated with the second electronic device 220.

Figure 11A:
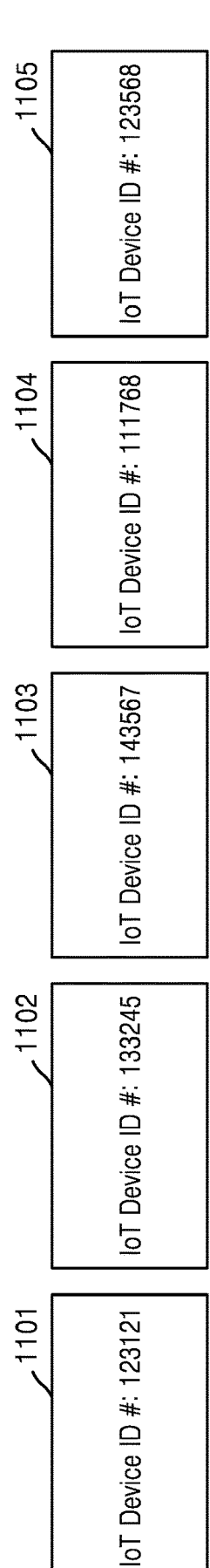
FIG. 11A is a diagram illustrating identifiers (IDs) of Internet-of-Things (IoT) devices according to an embodiment of the disclosure.

FIG. 11A is a diagram illustrating IDs of IoT devices according to an embodiment of the disclosure.

FIG. 11B is a diagram illustrating a list of applications executable by the IoT devices illustrated in FIG. 11A according to an embodiment of the disclosure.

Referring to FIGS. 11A and 11B, the first electronic device 210 may store a list of applications executable by identified second electronic devices 1101, 1102, 1103, 1104, and 1105. For example, in a case in which the first electronic device 210 determines that APP1 and APP2 are executable by the IoT device 1101 with an ID "123121", the first electronic device 210 may set flag values for the applications executable by the IoT device 1101 to 1, and store information about the applications executable by the IoT device 1101 from among a plurality of applications APP1, APP2, APP3, APP4, and APP5. Similarly, the first electronic device 210 may store a list of applications that are previously executed by the identified second electronic devices 1101, 1102, 1103, 1104, and 1105. For example, referring to FIGS. 11A and 11B, in a case in which APP3 is previously executed by the IoT device 1102 with an ID "133245", the first electronic device 210 may set a flag value for APP3 previously executed by the IoT device 1102 to 1, and store information about the application previously executed by the IoT device 1102 from among the plurality of applications APP1, APP2, APP3, APP4, and APP5.

Figure 12:
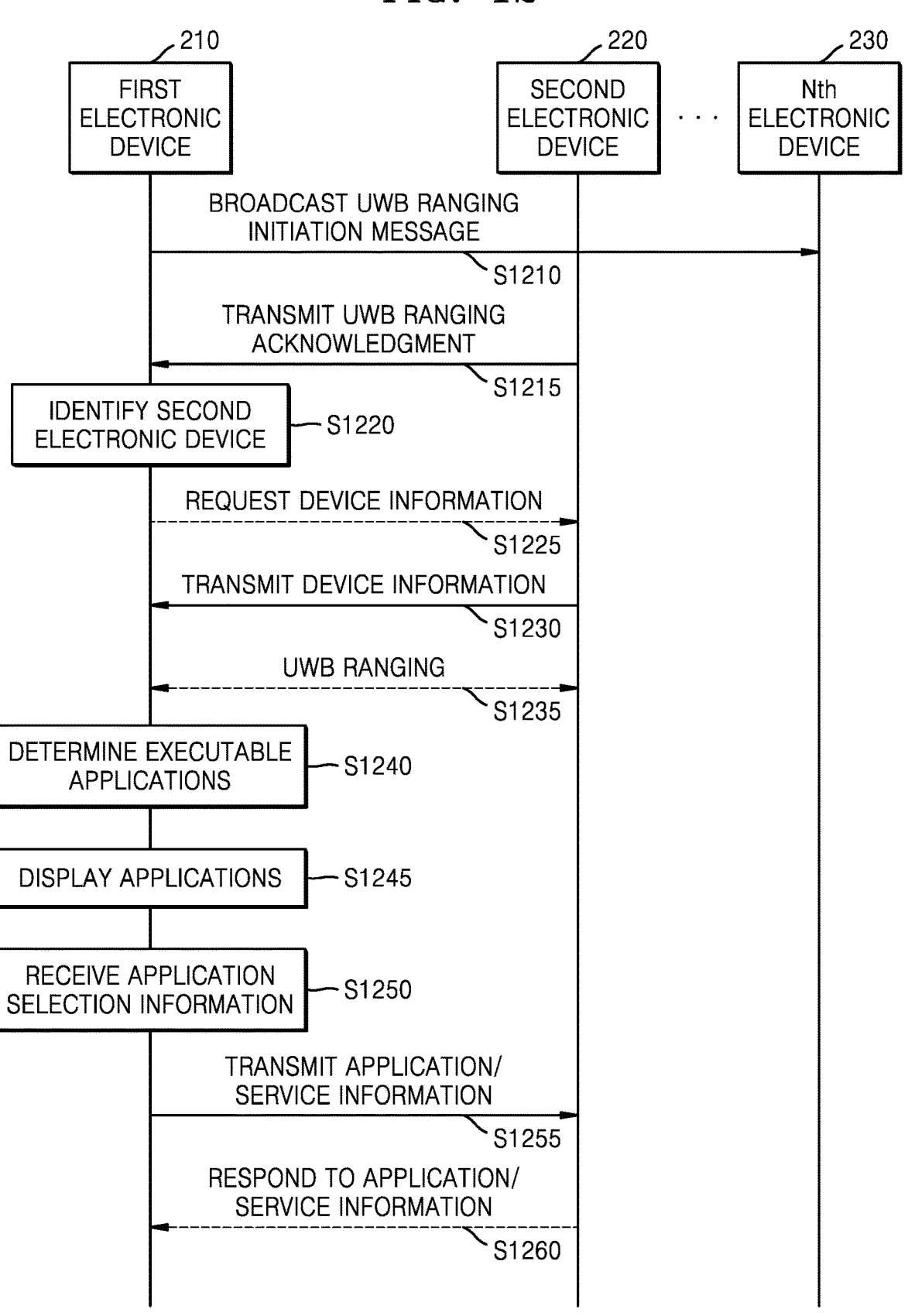
FIG. 12 is a flowchart of a method, performed by a first electronic device, of determining and executing an application executable by a second electronic device, according to an embodiment of the disclosure.

FIG. 12 is a flowchart of a method, performed by the first electronic device 210, of determining and executing an application executable by the second electronic device 220, according to an embodiment of the disclosure.

Referring to FIG. 12, in operation S1210, the first electronic device 210 broadcasts a UWB ranging initiation message to nearby electronic devices 220 and 230. The UWB ranging initiation message may include a UWB pairing request signal. UWB pairing may refer to a process in which the first electronic device 210 searches for, selects, and registers a nearby device with which to perform UWB communication.

In operation S1215, the second electronic device 220 that has received the UWB ranging initiation message may transmit a UWB ranging acknowledgment (ACK) to the first electronic device 210. In operation S1220, the first electronic device 210 may identify the second electronic device 220 by receiving the UWB ranging acknowledgment transmitted from the second electronic device 220. In operation S1225, the first electronic device 210 may transmit a device information request to the identified second electronic device 220. In a case in which the electronic device is set to, in response to receiving a UWB ranging initiation message, transmit device information without receiving a separate request, the requesting of the device information of operation S1225 may be omitted.

In operation S1230, the second electronic device 220 transmits information about the second electronic device 220 to the first electronic device. As described above, the information about the second electronic device 220 may include identification information, information about a communication protocol supported by the second electronic device 220, and information about a wireless communication method supported by the second electronic device 220.

In operation S1235, the first electronic device 210 and the second electronic device may perform UWB ranging according to the 802.15.4Z standard. The distance and direction between the first electronic device 210 and the second electronic device 220 may be determined through the UWB ranging. However, in a case in which information about the distance and direction between the first electronic device 210 and the second electronic device 220 is not required, the UWB ranging operation may be omitted.

In operation S1240, the first electronic device 210 determines applications executable by the second electronic device 220 based on the identification information of the second electronic device 220, the information about the communication protocol and the wireless communication method available in the second electronic device 220, which are received from the second electronic device 220. In operation S1245, the first electronic device 210 displays a list of the applications executable by the second electronic device 220 through the display, and in operation S1250, the first electronic device 210 receives information about an application selected by the user. In operation S1255, the information about the application selected by the user may be transmitted from the first electronic device 210 to the second electronic device 220, and the second electronic device 220 that has received the information about the application may execute the application. Depending on the application, the first electronic device 210 and the second electronic device 220 may interact with each other to execute the application. In operation S1260, the second electronic device 220 may respond as to whether the information about the application transmitted from the first electronic device 210 has been received.

Figure 13:
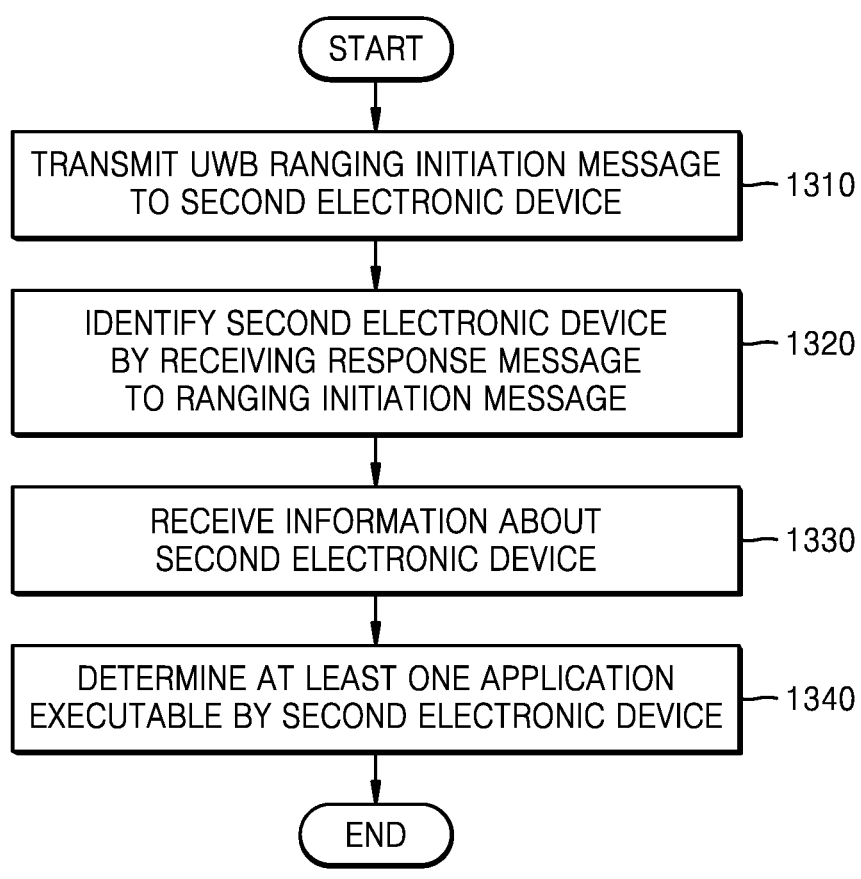
FIG. 13 is a flowchart of a method of operating a first electronic device, according to an embodiment of the disclosure.

FIG. 13 is a flowchart of a method of operating a first electronic device, according to an embodiment of the disclosure.

Referring to FIG. 13, in operation 1310, the first electronic device 210 transmits a UWB ranging initiation message to the second electronic device 220.

In operation 1320, the first electronic device 210 identifies the second electronic device 220 by receiving a response message to the ranging initiation message, from the second electronic device 220 that has received the UWB ranging initiation message.

In operation 1330, the first electronic device 210 receives information about the second electronic device 220 including identification information of the second electronic device 220, information about a communication protocol available in the second electronic device 220, and information about a wireless communication method available in the second electronic device 220.

In operation 1340, the first electronic device 210 determines at least one application executable by the second electronic device 220, based on the information about the second electronic device 220. The first electronic device 210 may display a list of applications executable by the second electronic device 220 through the display, and when the user selects an application to be executed by the second electronic device 220, transmit information about the selected application to the second electronic device 220 such that the selected application is executed by the second electronic device 220.

Figure 14:
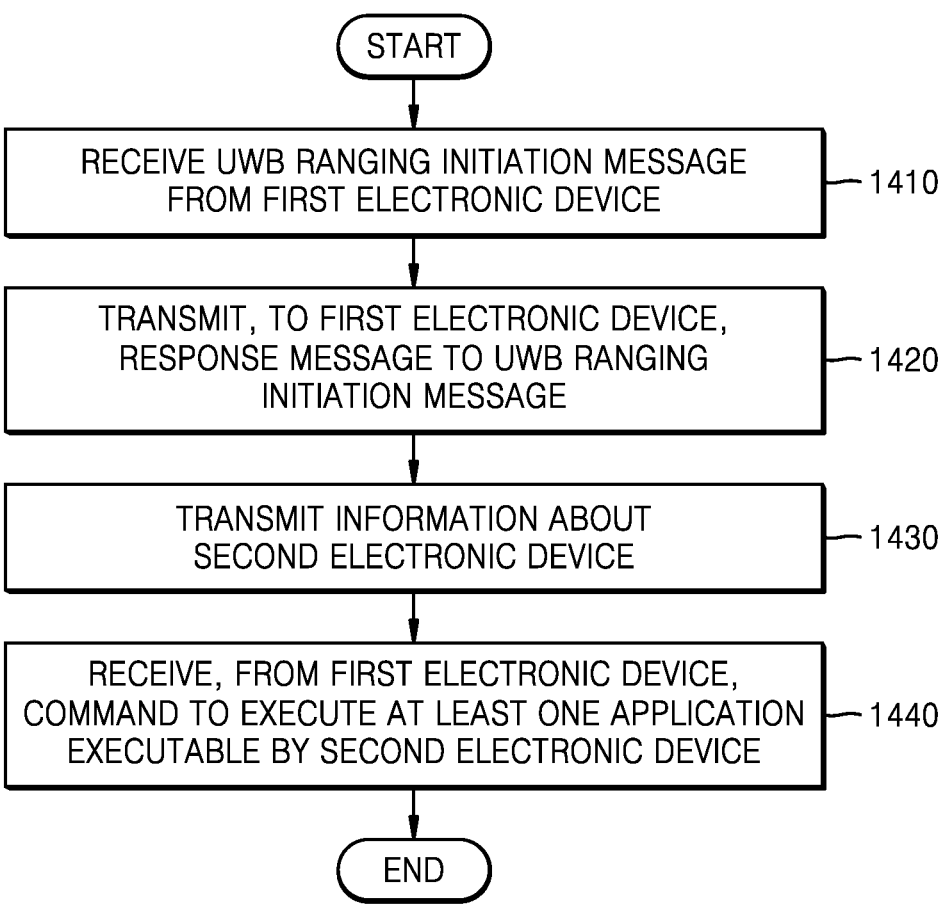
FIG. 14 is a flowchart of a method of operating a second electronic device, according to an embodiment of the disclosure.

FIG. 14 is a flowchart of a method of operating a second electronic device, according to an embodiment of the disclosure.

Referring to FIG. 14, in operation 1410, the second electronic device 220 receives a UWB ranging initiation message from the first electronic device 210. In operation 1420, the second electronic device 220 that has received the UWB ranging initiation message transmits, to the first electronic device 210, a response message to the UWB ranging initiation message. In operation 1430, the second electronic device 220 transmits, to the first electronic device 210, information about the second electronic device 220 including identification information of the second electronic device 220, information about a communication protocol available in the second electronic device 220, and information about a wireless communication method available in the second electronic device 220. In operation 1440, when a command to execute at least one application executable by the second electronic device 220 is received from the first electronic device 210, the second electronic device 220 executes the application.

Figure 15:
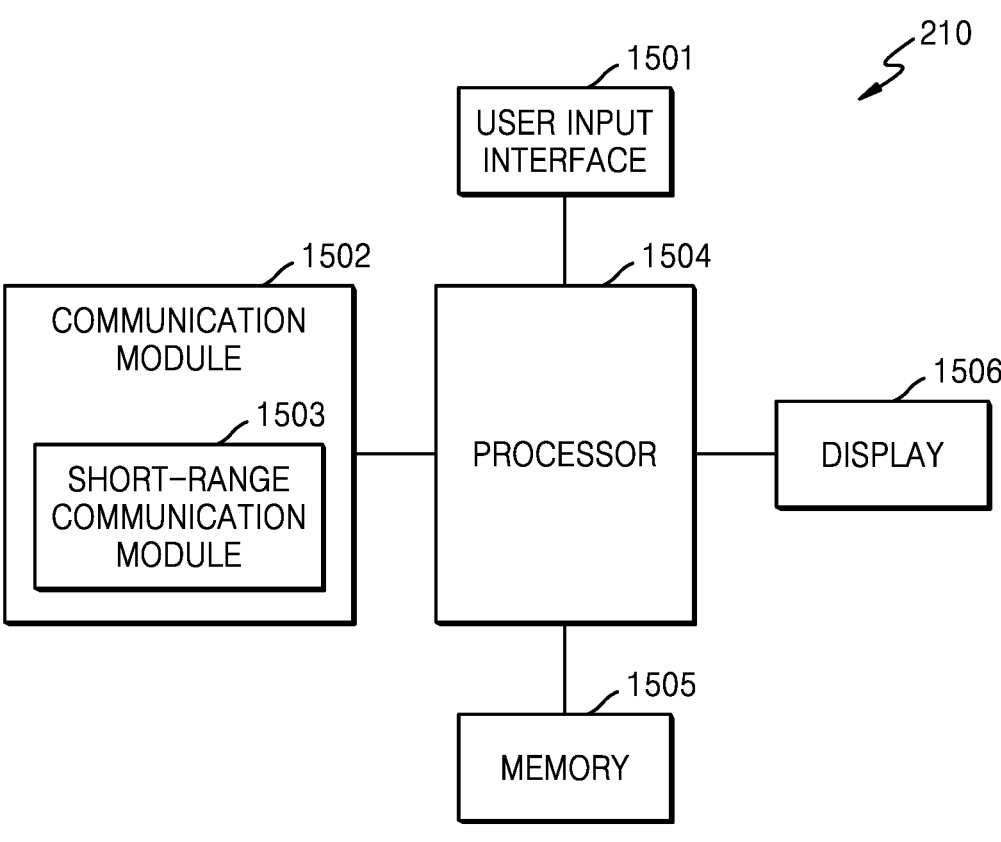
FIG. 15 is a block diagram illustrating a configuration of a first electronic device according to an embodiment of the disclosure.

FIG. 15 is a block diagram illustrating a configuration of a first electronic device according to an embodiment of the disclosure.

Referring to FIG. 15, the first electronic device 210 may include a user input interface 1501, a communication module 1502, a processor 1504, and a memory 1505. However, all of the components illustrated in FIG. 15 are not essential components. The first electronic device 210 may be implemented by more or fewer components than those illustrated in FIG. 15. The communication module 1502 may include one or more communication modules for communicating with the second electronic device 220 or an external electronic device. For example, the communication module 1502 may include a short-range communication module 1503, a mobile communication module, a wireless Internet module, a wired Internet module, and the like.

The short-range communication module 1503 refers to a module for short-range communication. Short-range communication technologies such as wireless LAN (e.g., Wi-Fi), Bluetooth, BLE, UWB, ZigBee, NFC, WFD, or Infrared Data Association (IrDA) may be used.

The mobile communication module may transmit and receive a wireless signal to and from at least one of a base station, an external terminal, or a server on a mobile communication network. The wireless Internet module refers to a module for wireless Internet access and may be built into or external to the first electronic device 210. The wired Internet module refers to a module for wired Internet access.

According to an embodiment of the disclosure, the communication module 1502 may perform a pairing operation using UWB and receive information about the identified second electronic device 220 from the second electronic device 220. Based on the information about the second electronic device 220, a user input for selecting an application from among applications executable by the second electronic device 220 may be received through the user input interface 1501, and the communication module 1502 may transmit execution information of the application selected by the user to the second electronic device 220. The communication module 1502 may receive a response message for application execution from the second electronic device 220. The user input interface 1501 may be configured by using at least one of a key pad, a dome switch, a touch pad (e.g., a resistive or capacitive touch pad), a jog wheel, or a jog switch. In particular, in a case in which the touch pad forms a layer structure with a display, they may be referred to as a touch screen.

The memory 1505 may store programs for the processor 1504 to perform processing and control. In addition, the memory 1505 may perform a function of storing input/output data. For example, the memory 1505 may store information about a peripheral electronic device identified through pairing with the first electronic device 210, information about applications executable by the peripheral electronic device, and information about applications previously executed in relation to the peripheral electronic device.

The processor 1504 controls the overall operation of the first electronic device 210. For example, the processor 1504 may control each component to determine applications executable by the second electronic device 220 based on information about the second electronic device 220 paired with the first electronic device 210, display a list of the applications executable by the second electronic device 220 through a display 1506, and transmit information about an application selected by the user to the second electronic device 220 through the communication module 1502.

Figure 16:
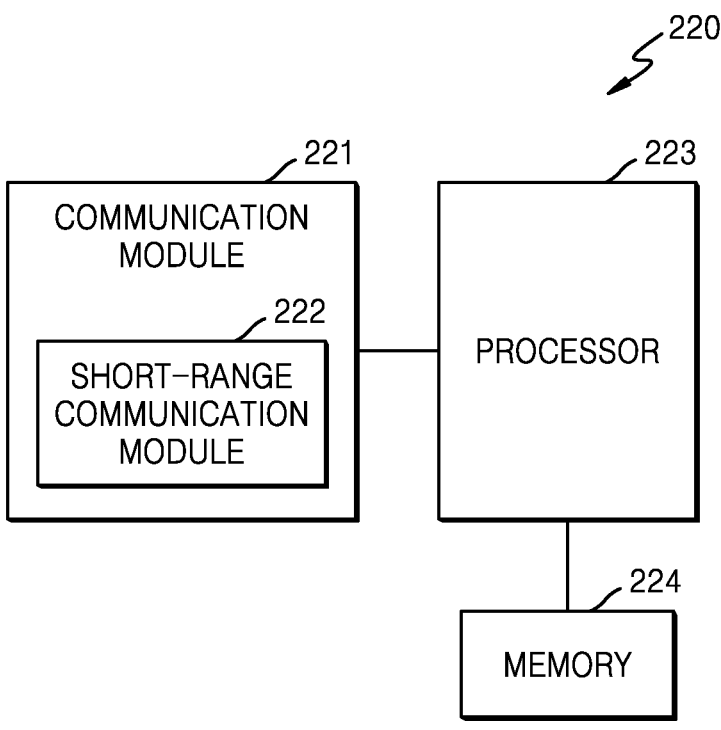
FIG. 16 is a block diagram illustrating a configuration of a second electronic device according to an embodiment of the disclosure.

FIG. 16 is a block diagram illustrating a configuration of the second electronic device 220 according to an embodiment of the disclosure.

Referring to FIG. 16, the second electronic device 220 may include a communication module 221, a processor 223, and a memory 224. The communication module 221 may include one or more components for communicating with the first electronic device 210 or an external electronic device. For example, the communication module 221 may include a short-range communication module 222, a mobile communication module, a wireless Internet module, a wired Internet module, and the like.

The communication module 221 receives a UWB ranging initiation message from the first electronic device 210, and transmits, to the first electronic device 210, a response message to the UWB ranging initiation message. In addition, the communication module 221 transmits, to the first electronic device 210, information about the second electronic device 220 including identification information of the second electronic device 220, information about a communication protocol available in the second electronic device 220, and information about a wireless communication method available in the second electronic device 220. In addition, the communication module 221 may receive, from the first electronic device 210, a command to execute an application executable by the second electronic device 220.

The memory 224 may store programs for the processor 223 to perform processing and control. In addition, the memory 224 may perform a function of storing input/output data. The processor 223 commonly controls the overall operation of the second electronic device 220. For example, the processor 223 controls the communication module 221 to receive a UWB ranging initiation message from the first electronic device 210, transmit, to the first electronic device 210, a response message to the UWB ranging initiation message, and transmit information about the second electronic device 220 to the first electronic device 210. In addition, the processor 223 controls the communication module 221 to receive, from the first electronic device 210, a command to execute an application executable by the second electronic device 200.

An embodiment of the disclosure may be implemented as a recording medium including computer-executable instructions, such as a computer-executable program module. The computer-readable medium may be any available medium which is accessible by a computer, and may include a volatile or non-volatile medium and a removable or non-removable medium. Also, the computer-readable medium may include a computer storage medium and a communication medium. The computer storage media include both volatile and non-volatile, removable and non-removable media implemented in any method or technique for storing information such as computer readable instructions, data structures, program modules or other data. The communication medium may typically include computer-readable instructions, data structures, or other data of a modulated data signal such as program modules. In addition, it is possible to record a database used in the disclosure on a recording medium.

The disclosure has focused on various preferred embodiments illustrated in the drawings. The embodiments are only illustrative without limiting the disclosure and should be understood in the illustrative sense only and not for the purpose of limitation. It will be understood by those of skill in the art to which the disclosure belongs that various changes in form and details may be made in the embodiments without changing the technical spirit and mandatory features of the disclosure. For example, each component described as a single type may be carried out by being distributed, and likewise, components described as a distributed type may also be carried out by being coupled.

Although particular terms are used in the specification, the terms are for the purpose of describing the disclosure only and are not intended to be limiting of the meaning or the scope of the disclosure as defined by the claims. The operations according to the disclosure does not necessarily have to be performed in the order described herein, and may be performed in parallel, selectively, or individually.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a first electronic device, the method comprising:

transmitting an ultra-wideband (UWB) ranging initiation message to a second electronic device;

identifying the second electronic device by receiving a response message to the UWB ranging initiation message from the second electronic device;

receiving, from the second electronic device, information about the second electronic device including identification information of the second electronic device, information about a communication protocol available in the second electronic device, and information about a wireless communication method available in the second electronic device; and based on the information about the second electronic device, determining at least one application executable by the second electronic device.

2. The method of claim 1, wherein the determining of the at least one application comprises, based on at least one of the identification information of the second electronic device, the information about the communication protocol, or the information about the wireless communication method, determining the at least one application executable by the second electronic device.

3. The method of claim 1, wherein the determining of the at least one application comprises:

determining the at least one application by comparing information about a communication protocol required for executing an application installed in the first electronic device and information about a wireless communication method required for executing the application installed in the first electronic device, with the information about the communication protocol available in the second electronic device and the information about the wireless communication method available in the second electronic device.

4. The method of claim 1, wherein the information about the second electronic device is received by using:
   a payload containing the identification information of the second electronic device;
   a setting value for the communication protocol available in the second electronic device among setting values respectively assigned to a plurality of communication protocols; and
   flag information indicating whether the second electronic device is able to use each of a plurality of preset wireless communication methods.

5. The method of claim 1, further comprising:
   displaying information about the determined at least one application;
   receiving a user input for selecting an application from among the determined at least one application; and
   transmitting information about the selected application to the second electronic device.

6. The method of claim 5, wherein the displaying of the information about the determined at least one application comprises:
   adding an identification mark to an application executable by the second electronic device among applications installed in the first electronic device; and
   displaying the applications installed in the first electronic device.

7. The method of claim 5, wherein the displaying of the information about the determined at least one application comprises displaying information about an application previously executed in relation to the second electronic device.

8. The method of claim 1, wherein the communication protocol comprises at least one of Hypertext Transfer Protocol (HTTP), Hypertext Transfer Protocol Secure (HTTPS), File Transfer Protocol (FTP), Secure File Transfer Protocol (SFTP), Telnet (TErminaL NETwork), Post Office Protocol version 3 (POP3), Simple Mail Transfer Protocol (SMTP), Secure Shell (SSH), Secure Socket Layer (SSL), Simple Object Access Protocol (SOAP), or Address Resolution Protocol (ARP).

9. The method of claim 1, wherein the wireless communication method comprises at least one of Wi-Fi, Bluetooth, Bluetooth Low Energy (BLE), Wi-Fi direct (WFD), UWB, near-field communication (NFC), or Zigbee.

10. A first electronic device comprising:
   a memory storing one or more instructions; and
   at least one processor configured to:
      execute the one or more instructions stored in the memory to transmit an ultra-wideband (UWB) ranging initiation message to a second electronic device,
      identify the second electronic device by receiving a response message to the UWB ranging initiation message from the second electronic device,
      receive, from the second electronic device, information about the second electronic device including identification information of the second electronic device, information about a communication protocol available in the second electronic device, and information about a wireless communication method available in the second electronic device, and
      based on the information about the second electronic device, determine at least one application executable by the second electronic device.

11. The first electronic device of claim 10, wherein the at least one processor is further configured to, based on at least one of the identification information of the second electronic device, the information about the communication protocol, or the information about the wireless communication method, determine the at least one application executable by the second electronic device.

12. The first electronic device of claim 10, wherein the at least one processor is further configured to:
   determine the at least one application by comparing information about a communication protocol required for executing an application installed in the first electronic device and information about a wireless communication method required for executing the application, with the information about the communication protocol available in the second electronic device and the information about the wireless communication method available in the second electronic device.

13. The first electronic device of claim 10, wherein the information about the second electronic device is received by using:
   a payload containing the identification information of the second electronic device;
   a setting value for the communication protocol available in the second electronic device among setting values respectively assigned to a plurality of communication protocols; and
   flag information indicating whether the second electronic device is able to use each of a plurality of preset wireless communication methods.

14. The first electronic device of claim 10, wherein the at least one processor is further configured to:
   display information about the determined at least one application;
   receive a user input for selecting an application from among the determined at least one application; and
   transmit information about the selected application to the second electronic device.

15. The first electronic device of claim 14, wherein the at least one processor is further configured to:
   add an identification mark to an application executable by the second electronic device among applications installed in the first electronic device; and
   display the applications installed in the first electronic device.

16. The first electronic device of claim 14, wherein the at least one processor is further configured to display information about an application previously executed in relation to the second electronic device.

17. A method of operating a second electronic device, the method comprising:
   receiving an ultra-wideband (UWB) ranging initiation message from a first electronic device;
   transmitting, to the first electronic device, a response message to the UWB ranging initiation message;
   transmitting, to the first electronic device, information about the second electronic device including identification information of the second electronic device, information about a communication protocol available in the second electronic device, and information about a wireless communication method available in the second electronic device; and
   receiving, from the first electronic device, a command to execute at least one application executable by the second electronic device.

18. A second electronic device comprising:
   a memory storing one or more instructions; and at least one processor configured to:

execute the one or more instructions stored in the memory to receive an ultra-wideband (UWB) ranging initiation message from a first electronic device, transmit, to the first electronic device, a response message to the UWB ranging initiation message, transmit, to the first electronic device, information about the second electronic device including identification information of the second electronic device, information about a communication protocol available in the second electronic device, and information about a wireless communication method available in the second electronic device, and receive, from the first electronic device, a command to execute at least one application executable by the second electronic device.

19. The second electronic device of claim 18, wherein the identification information of the second electronic device includes an ID value or a session ID value assigned by the first electronic device during a link establishment process.

20. The second electronic device of claim 18, wherein the processor is further configured to execute the at least one application indicated by the command.

\*   \*   \*   \*   \*